United States Patent
Nakajima et al.

(10) Patent No.: US 6,495,225 B1
(45) Date of Patent: Dec. 17, 2002

(54) MOLDING MATERIAL

(75) Inventors: Akihisa Nakajima, Hino (JP); Hiroshi Kibayashi, Hino (JP); Yuji Hosoi, Hino (JP); Yasuo Kurachi, Hino (JP); Yuichi Atarashi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/466,558

(22) Filed: Dec. 17, 1999

(30) Foreign Application Priority Data

Dec. 25, 1998 (JP) .......................................... 10-369487
Feb. 1, 1999 (JP) .......................................... 11-023849
Feb. 23, 1999 (JP) .......................................... 11-044789

(51) Int. Cl.$^7$ ...................... B29K 201/00; B29K 401/00
(52) U.S. Cl. .................. 428/35.7; 428/35.6; 428/903.3; 524/13; 524/14
(58) Field of Search ................................. 428/35.7, 35.6; 524/13, 14

(56) References Cited

U.S. PATENT DOCUMENTS 4,323,625 A * 4/1982 Coran et al. ................. 428/361
5,486,553 A * 1/1996 Deaner et al. ................. 524/13

FOREIGN PATENT DOCUMENTS

CA        1008609 A  *  4/1977  .......... D21H/00/01
WO       WO-99/11672  *  3/1999  .......... C08B/37/14

* cited by examiner

Primary Examiner—Sandra M. Nolan
(74) Attorney, Agent, or Firm—Frishauf, Holtz, Goodman & Chick, P.C.

(57) ABSTRACT

Molding materials comprising a cellulose based fiber, and a thermoplastic resin in an amount of less than said cellulose based resin is disclosed.

25 Claims, No Drawings

MOLDING MATERIAL

FIELD OF THE INVENTION

The present invention relates to a molding material for photosensitive photographic materials, which is mainly comprised of a vegetable fiber, exhibits good external appearance, emits no offensive odor, and does not cause any problem with fog formation during storage when employed as a container for photosensitive photographic materials.

BACKGROUND OF THE INVENTION

There are various types of molding materials employed for photosensitive materials. For instance, there are materials employed for imaging units such as cameras, and a body for lens-fitted film, resin canisters, cassettes for loading of rolled film strips, and the like.

These are molded, employing various materials in accordance with types, sizes, wound lengths, and uses of the employed photosensitive materials. Generally, however, said materials are divided into paper and plastics. In more detail, paper includes corrugated cardboard, paper board, laminated materials of paper with plastic film or metal foil, and the like. Molding materials for photosensitive materials, which are molded employing paper and/or plastics are required to be low cost and to cause no problems as waste when discarded or incinerated. Those which are molded employing paper cause no critical problem as waste. However, the strength is weak, and problems occur in which the size as well as wound length of photosensitive materials to be placed is limited and further critical problems occur in which during transportation, deformation an breakage tend to occur.

Those which are molded employing plastics exhibit high strength. However, problems occur in terms of cost as well as waste disposal. Those prepared by combining paper and plastics exhibit intermediate properties. However, problems also occur in disposal of combined plastic and paper materials when disposal requires separation the paper and plastics as waste, whereby, much labor is required.

As methods to overcome these problems, Japanese Patent Publication Open to Public Inspection No. 7-225453 proposes a light shielding container which is molded employing a mixture of a resin with a cellulose based fiber. However, when employing the molding materials described in the example, problems with external flatness and glossiness occur. In addition, it has been found that problems with the generation of offensive odor also result. Furthermore, it has been found that when it is used as a container for a photosensitive material, and said photosensitive material is stored in it over an extended period of time (for at least 6 months), problems occur in which photographic characteristics are adversely affected, and specifically, fog of said photosensitive material increases. Japanese Patent Publication Open to Public Inspection Nos. 61-225234 and 5-210217 also describe materials prepared by mixing a fiber with a thermoplastic resin. However it has been found that the same problems as described above occur.

An object of the present invention is to provide a molding material which exhibits excellent external appearance and emits no offensive odor, while overcoming the aforementioned problems. It is also an object to provide a molding material for photosensitive photographic materials, which gives no adverse effect on photographic performances, when employed as containers for photosensitive photographic materials. Another object is to provide a thermoplastic composition which exhibits excellent dimensional stability as well as excellent disposal properties as waste, even when employed in a thermoplastic composition comprising at least 50 percent of a cellulose based fiber.

Various shapes of molded products have been employed which employ molding methods such as injection molding, compression molding, injection-compression molding, extrusion molding, and the like, using a thermoplastic resin composition comprising a vegetable fiber as the main component. Such compositions are suitably employed for extrusion molding followed by machining, to produce, for example, base board and verandah, floor materials, handrails, materials in kitchens and bathrooms for house construction, materials for furniture, or board heartwood as interior finishing materials in cars. Wood flour filled vinyl chloride resins have been employed for similar uses. However, when said resins are employed, problems occur in which toxic gasses are generated during incineration in waste treatment, as well as during accidental fires.

Recently, the removal of vinyl chloride based compounds from waste has been demanded to overcome air pollution problems during incineration and the like, and materials which replace said compounds are urgently sought. Based on non-pollution, cost, ease of conversion, and the like, those which have received most attention are polyolefin resins such as polyethylene and polypropylene.

However, when a non-polar polyolefin resin is combined with a vegetable fiber with high polarity, it is technically difficult. to cause the resulting combination to exhibit features of each component as well as new functions. For example, vegetable materials such as wood flour and the like occasionally comprise, except for moisture, a large amount of components such as polysaccharides, lignin, tannin, and the like which tend to chemically and thermally undergo decomposition and deterioration. Though these can be removed, problems occur in which cellulose has no affinity with a polyolefin resin. In order to blend such components, a fairly large amount of energy is required. Due to that, after the completion of blending, the vegetable fiber as well as the resin is deteriorated.

Of conventional techniques, those in which a mixture consisting of a vegetable fiber and a thermoplastic resin in an amount of less than said vegetable fiber is employed, as the main component, include the following. Japanese Patent Publication Open to Public Inspection No. 54-72247 describes a method in which wood flour is subjected to thermal treatment at 160 to 260° C. in advance, and a processing aid, such as a thermoplastic resin, is added to the resulting wood flour, is allowed to melt and impregnate the wood flour, and said process is carried out at a relatively high temperature over a relatively long period to decrease the water content of said vegetable fiber. However, problems have occurred in which the strength decreases due to the deterioration of the components of the wood flour. Further, listed as processing aids of the resin are those having a melting point of 40 to 250° C. Of organic processing aids, some are not preferred due to low compatibility with polyethylene resin which results in a bleeding-out phenomenon and relatively large degradation of physical properties. Furthermore, Japanese Patent Publication Open to Public Inspection No. 63-112639 discloses a composition which is prepared by combining a polyolefin resin with mineral oil, synthetic oil and wax, an inorganic filler, or an organic filler comprising wood flour. However, when a mixture of mineral oil and synthetic oil, which tend to cause bleeding-out, is employed in molded parts, problems with external appearance have occurred. Japanese Patent Publication Open to Public Inspection No. 55-127451 discloses a composition comprised of polyolefin powder, and wood flour, calcium carbonate or talc. The use of polyolefin powder is a preferred method to improve hopper bridging as well as dispersibility. Furthermore, Japanese Patent Publication Open to Public Inspection No. 58-21755 discloses a composition prepared by combining polypropylene with wood flour as a lubricant. Listed as lubricants are higher alcohols and acid esters, as well as glycerin and fatty acid esters, and their functions are improvement in wettability of wood flour as well as polypropylene, enhancement of physical-properties and improvement in extrusion properties. Next, Japanese Patent Publication No. 58-56534 discloses a composition comprised of polyolefin resin and rosin or derivatives thereof, or petroleum resin, plasticizer and a vegetable fiber powder. A light shielding container for photosensitive materials is proposed which is prepared by mixing cellulose based fiber and resin described in Japanese Patent Publication Open to Public Inspection No. 7-225453 and molding the resulting mixture. However, it has been found that all of these inventions result in deterioration of the fibers during mixing with a vegetable fiber, and the strength as well as tenacity is insufficient.

An object of the present invention is to provide a molded product which, upon employing a resin component in combination with a vegetable fiber, generate no toxic gasses during incineration in waste treatment as well as during accidental fires, overcomes problems with degradation of a vegetable fiber, further is not likely to break when dropped, and exhibits excellent external appearance, and in addition a molding material which gives no adverse effects in photographic performances, when employed as a container for photosensitive photographic materials.

Item 1.

Molding materials comprising a cellulose based fiber, and a thermoplastic resin in an amount of less than said cellulose based resin.

wherein when a 100 cm$^2$ photosensitive material which is removed from an aluminum vessel having an inner diameter of 76 mm and a height of 50 mm, after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours, is designated as Sample A, and a 100 cm$^2$ photosensitive material of the same type of said photosensitive material which is removed from an aluminum vessel having an inner diameter of 76 mm and a height of 50 mm after said photosensitive material left standing at 23° C. and 55% RH for 24 hours and 4 g of said molding material left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours, is designated as Sample B, Sample A and Sample B are then subjected to white light exposure through a sensitometric step wedge and to the following photographic processing to obtain a fog density (fog density of Sample B−fog density of Sample A) of the green-sensitive layer ≦0.2.

"Processing Conditions"

| Processing Step | Processing Time | Processing Temperature |
|---|---|---|
| Color Development | 3 minutes 15 seconds | 38° C. |
| Bleaching | 45 seconds | 38° C. |
| Fixing | 1 minute 30 seconds | 38° C. |
| Stabilizing | 1 minute | 38° C. |
| Drying | 1 minute | 55° C. |

"Color Developer"

| | |
|---|---|
| Water | 800 cc |
| Potassium carbonate | 30 g |
| Sodium bicarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(βhydroxyethyl)-aniline sulfate | 4.5 g |
| Diethylenetriaminepentaacetic acid | 3.0 g |
| Potassium hydroxide | 1.2 g |
| Water to make | 1 liter |

The pH is adjusted to 10.06 using potassium hydroxide or 20% sulfuric acid.

"Bleaching Solution"

| | |
|---|---|
| Water | 700 cc |
| 1,3-Diaminopropanetetraacetic acid ferric ammonium | 125 g |
| Ethylenediaminetetraacetic acid | 2 g |
| Sodium nitrate | 40 g |
| Ammonium bromide | 150 g |
| Glacial acetic acid | 40 g |
| Water to make | 1 liter |

The pH is adjusted to 4.4 using aqueous ammonia or glacial acetic acid.

"Fixing Solution"

| | |
|---|---|
| Water | 800 cc |
| Ammonium thiocyanate | 120 g |
| Ammonium thiosulfate | 150 g |
| Sodium sulfite | 15 g |
| Ethylenediaminetetraacetic acid | 2 g |

After adjusting the pH to 6.2 using aqueous ammonia or glacial acetic acid, the total volume is adjusted-to 1 liter by adding water.

"Stabilizer"

| | |
|---|---|
| Water | 900 cc |
| Paraoctylphenyl polyoxyethylene ether (n = 10) | 2.0 g |
| Dimethylolurea | 0.5 g |
| Hexamethylenetetramine | 0.2 g |
| 1,2-Benzoisothiazoline-3-one | 0.1 g |

| -continued | |
|---|---|
| "Stabilizer" | |
| Siloxane | 0.1 g |
| Aqueous ammonia | 0.5 cc |
| Water to make | 1 liter |

The pH is adjusted to 8.5 employing aqueous ammonia or 50% sulfuric acid.

The inventors of the present invention have diligently investigated molding materials which may minimize the fogging problem. As a result, said inventors have found a molding material which exhibits surprising advantages in which fogging is not only minimized but also the generation of offensive odor as well as the degradation of external appearance is minimized.

Item 2

The molding material described in Item 1,
  after 1 g of said molding material is left standing at 23° C. and 55% RH for 24 hours, the resulting material is placed into a 30-cc vessel and tightly sealed, is further heated for 30 minutes in an oil bath maintained at 120° C., and thereafter, the amount of furfural, generated in said vessel, is no more
  than 10 μg/g of the molding material.

Item 3

The molding material described in Item 1, and said thermoplastic resin comprises no halogen atom.

Item 4

The molding material described in Item 1, and said cellulose based fiber comprises a natural fiber.

Item 5

The molding material described in Item 4, and said natural fiber comprises a vegetable fiber.

Item 8

The molding material described in Item 1, and the molding material comprises at least one selected from the compounds represented by general formulas (I) through (V) or tetramethylolcyclohexanol,

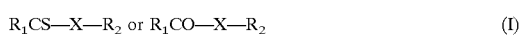

in general formula (I), $R_1$ represents a hydrogen atom, an alkyl group, an aryl group, an alkoxy group, an acylamino group, or an amino group, $R_2$ represents a hydrogen atom, an alkyl group, an aryl group, an acyl group, an alkoxycarbonyl group, a carbamoyl group, an amino group, or an amidino group, $R_1$ and $R_2$ may bond to form a ring, X represents —CH$_2$— or —NH—;

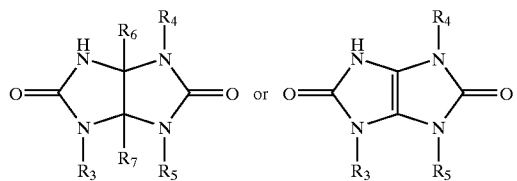

in general formula (II), $R_3$, $R_4$ and $R_5$ may be the same or different, and each represents a hydrogen atom, an alkyl group, an alkenyl group, an aralkyl group, an aryl group, or an acyl group, $R_6$ and $R_7$ each represents a hydrogen atom or an alkyl;

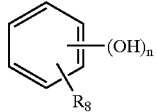

in general formula (III), $R_8$ represents a hydrogen atom, an alkyl group, or an aryl group, $R_8$ may be a group which forms naphthalene ring together with a phenyl ring, "n" represent an integer of 2 to 4;

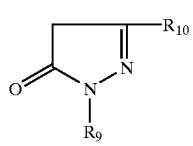

in general formula (IV), $R_9$ represents a hydrogen atom or a substituent, $R_{10}$ represents a hydrogen atom or a substituent;

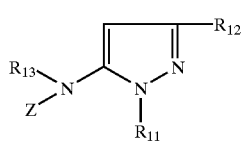

in general formula (V), $R_{11}$ and $R_{12}$ each represents a hydrogen atom or a substituent, and $R_{13}$ represents a hydrogen atom or an alkyl group, Z represents a hydrogen atom, an alkyl group, an aryl group, —SO$_2$R$_{14}$, or —SO$_2$N(R$_{14}$)(R$_{15}$), $R_{14}$ represents an alkyl group, an aryl group, or a heterocyclic ring group, and $R_{15}$ is as defined above for $R_{13}$, $R_{13}$ and Z may be joined together to form a ring.

Item 15

The molded product molded employing the molding material described in Item 1.

Item 16

The molded product described in Item 15, and said molded product is a container for a photosensitive material.

Item 17

The molded product described in Item 16, and said molded product is a part of a lens-fitted film.

Item 18

The molded product described in Item 17, and said molded product is an external packaging member of a lens-fitted film.

Item 19

The molded product described in Item 18, and said molded product is a front cover or a rear cover of a lens-fitted film.

Item 20

A production method of a molding material, it is comprised of the following steps:
  Cellulose based fiber together with a thermoplastic resin in an amount of less than said cellulose based fiber is kneaded,
  wherein
  when a 100 cm$^2$ photosensitive material which is removed from an aluminum vessel having an inner diameter of 76 mm and a height of 50 mm after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours is designated as Sample A, and a 100 cm² photosensitive material of the same type of said photosensitive material which is removed from an aluminum vessel having an inner diameter of 76 mm and a height of 50 mm after said photosensitive material left standing at 23° C. and 55% RH for 24 hours and 4 g of said molding material left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours is designated as Sample B, Sample A and Sample B are subjected to white light exposure through a sensitometric step wedge and to the following photographic processing to obtain a fog density (fog density of Sample B−fog density of Sample A) of the green-sensitive layer $\leq 0.2$.

| "Processing Conditions" | | |
| --- | --- | --- |
| Processing Step | Processing Time | Processing Temperature |
| Color Development | 3 minutes 15 seconds | 38° C. |
| Bleaching | 45 seconds | 38° C |
| Fixing | 1 minute 30 seconds | 38° C |
| Stabilizing | 1 minute | 38° C |
| Drying | 1 minute | 55° C |

| "Color Developer" | |
| --- | --- |
| Water | 800 cc |
| Potassium carbonate | 30 g |
| Sodium bicarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(βhydroxyethyl)-aniline sulfate | 4.5 g |
| Diethylenetriaminepentaacetic acid | 3.0 g |
| Potassium hydroxide | 1.2 g |
| Water to make | 1 liter |

The pH is adjusted to 10.06 using potassium hydroxide or 20% sulfuric acid.

| "Bleaching Solution" | |
| --- | --- |
| Water | 700 cc |
| 1,3-Diaminopropanetetraacetic acid ferric ammonium | 125 g |
| Ethylenediaminetetraacetic acid | 2 g |
| Sodium nitrate | 40 g |
| Ammonium bromide | 150 g |
| Glacial acetic acid | 40 g |
| Water to make | 1 liter |

The pH is adjusted to 4.4 using aqueous ammonia or glacial acetic acid.

| "Fixing Solution" | |
| --- | --- |
| Water | 800 cc |
| Ammonium thiocyanate | 120 g |

| -continued | |
| --- | --- |
| "Fixing Solution" | |
| Ammonium thiosulfate | 150 g |
| Sodium sulfite | 15 g |
| Ethylenediamnetetraacetic acid | 2 g |

After adjusting the pH to 6.2 using aqueous ammonia or glacial acetic acid, the total volume is adjusted to 1 liter by adding water.

| "Stabilizer" | |
| --- | --- |
| Water | 900 cc |
| Paraoctylphenyl polyoxyethylene ether (n = 10) | 2.0 g |
| Dimethylolurea | 0.5 g |
| Hexamethylenetetramine | 0.2 g |
| 1,2-Benzoisothiazoline-3-one | 0.1 g |
| Siloxane | 0.1 g |
| Aqueous ammonia | 0.5 cc |
| Water to make | 1 liter |

The pH is adjusted to 8.5 employing aqueous ammonia or 50% sulfuric acid.

Item 21

The production method of a molding material described in Item 20, and said kneading is carried out employing a banbury mixer.

A molding material characterized in comprising a mixture consisting of a vegetable fiber and a thermoplastic resin in an amount of less than said vegetable fiber as the main components and in satisfying the conditions set forth below:

Conditions:

When a 100 cm² photosensitive material which is removed from an aluminum vessel having an inner diameter of 76 mm and a height of 50 mm after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours, is designated as Sample A, and a 100 cm² photosensitive material which is removed from an aluminum vessel having an inner diameter of 76 mm and a height of 50 mm, after said photosensitive material left standing at 23° C. and 55% RH for 24 hours and 4 g of a molding material, comprised of a mixture of a vegetable fiber and a thermoplastic resin in an amount of less than said vegetable fiber as the main component, left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours, is designated as Sample B, Sample A and Sample B are subjected to while light exposure through a sensitometric step wedge and to the following photographic processing to obtain a fog density (fog density of Sample B−fog density of Sample A) of the green-sensitive layer $\leq 0.2$.

"Processing Conditions"

| Processing Step | Processing Time | Processing Temperature |
|---|---|---|
| Color Development | 3 minutes 15 seconds | 38° C. |
| Bleaching | 45 seconds | 38° C. |
| Fixing | 1 minute 30 seconds | 38° C. |
| Stabilizing | 1 minute | 38° C. |
| Drying | 1 minute | 55° C. |

"Color Developer"

| | |
|---|---|
| Water | 800 cc |
| Potassium carbonate | 30 g |
| Sodium bicarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(βhydroxyethyl)-aniline sulfate | 4.5 g |
| Diethylenetriaminepentaacetic acid | 3.0 g |
| Potassium hydroxide | 1.2 g |
| Water to make | 1 liter |

The pH is adjusted to 10.06 using potassium hydroxide or 20% sulfuric acid.

"Bleaching Solution"

| | |
|---|---|
| Water | 700 cc |
| 1,3-Diaminopropanetetraacetic acid ferric ammonium | 125 g |
| Ethylenediaminetetraacetic acid | 2 g |
| Sodium nitrate | 40 g |
| Ammonium bromide | 150 g |
| Glacial acetic acid | 40 g |
| Water to make | 1 liter |

The pH is adjusted to 4.4 using aqueous ammonia or glacial acetic acid.

"Fixing Solution"

| | |
|---|---|
| Water | 800 cc |
| Ammonium thiocyanate | 120 g |
| Ammonium thiosulfate | 150 g |
| Sodium sulfite | 15 g |
| Ethylenediamnetetraacetic acid | 2 g |

After adjusting the pH to 6.2 using aqueous ammonia or glacial acetic acid, the total volume is adjusted to 1 liter by adding water.

"Stabilizer"

| | |
|---|---|
| Water | 900 cc |
| Paraoctylphenyl polyoxyethylene ether (n = 10) | 2.0 g |
| Dimethylolurea | 0.5 g |
| Hexamethylenetetramine | 0.2 g |
| 1,2-Benzoisothiazoline-3-one | 0.1 g |

-continued
"Stabilizer"

| | |
|---|---|
| Siloxane | 0.1 g |
| Aqueous ammonia | 0.5 cc |
| Water to make | 1 liter |

The pH is adjusted to 8.5 employing aqueous ammonia or 50% sulfuric acid.

A molded product characterized in comprising a mixture consisting of a vegetable fiber and a thermoplastic resin in an amount of leas than said vegetable fiber as main components and of satisfying the conditions set forth below:

Conditions:

When a 100 cm$^2$ photosensitive material, which is removed from an aluminum vessel having an inner diameter of 76 mm and a height of 50 mm, after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours, is designated as Sample C, and a 100 cm$^2$ photosensitive material which is removed from an aluminum vessel having an inner diameter of 76 mm and a height of 50 mm after said photosensitive material left standing at 23° C. and 55% RH for 24 hours and 4 g of a molding product, which is obtained by crushing into pieces having a size of approximately no more than 5 mm a molded product having a specified shape comprised of a mixture consisting of a vegetable fiber and a thermoplastic resin in an amount of less than said vegetable fiber, left standing at 23° C. and 55% RH for 24 hours, are placed into said aluminum vessel and are tightly sealed, and subsequently are left standing at 65° C. for 72 hours, and thereafter, are cooled at 23° C. and 55% RH for 12 hours, is designated as Sample D, Sample C and Sample D are subjected to white light exposure through a sensitometric step wedge and to the following photographic processing to obtain a fog density (fog density of Sample D−fog density of Sample C) of the green-sensitive layer $\leq 0.2$.

A thermoplastic composition comprising at least 50 percent by weight of a non-wood fiber as a natural fiber and a thermoplastic resin.

The thermoplastic composition described in any one of Items 1 through 7, characterized in that a mixture comprising at least a natural fiber and thermoplastic resin is obtained by kneading, employing a Banbury mixer.

The thermoplastic composition described in Item 8, characterized in that a mixture consisting of a natural fiber and a thermoplastic resin is kneaded, at a maintained temperature of 70 to 150° C.

A molding material characterized in comprising a mixture consisting of a vegetable fiber and a thermoplastic resin having no halogen atom in an amount of less than said vegetable fiber as the main component, and satisfying the conditions described below.

Conditions

One gram of a sample is accurately weighed. Said weighed sample is conditioned at ambient conditions of 23° C. and 55% RH for 24 hours, and thereafter is placed in a 300-cc vial, which is tightly sealed with an aluminum seal. After the vial is heated for 30 minutes in an oil bath maintained at 120° C., the amount of furfural generated in the vial is no more than 10 $\mu$g/g of the sample.

The present invention will be detailed below.

The molding material of the present invention comprises a cellulose based fiber as well as a thermoplastic resin in an amount of less than said cellulose based fiber.

Furthermore, the molding material has the following feature. When a 100 cm$^2$ photosensitive material, which is removed from an aluminum vessel having an inner diameter of 76 mm and a height of 50 mm after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours, is designated as Sample A, and a 100 photosensitive material of the same type of said photosensitive material, which is removed from an aluminum vessel having an inner diameter of 76 mm and a height of 50 mm after said photosensitive material left standing at 23° C. and 55% RH for 24 hours and 4 g of said molding material left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours, is designated as Sample B, Sample A and Sample B are subjected to white light exposure through a sensitometric step wedge and to the following photographic processing to obtain a fog density (fog density of Sample B−fog density of Sample A) of the green-sensitive layer ≦0.2.

Further, the photosensitive material as described herein preferably represents ASA 400 color negative film, more preferably LV400 manufactured by Konica Corporation and more preferably represents the photosensitive material sample 101 described in Example 2 of Japanese Patent Publication Open to Public Inspection No. 8-69073.

| "Processing Conditions" | | |
|---|---|---|
| Processing Step | Processing Time | Processing Temperature |
| Color Development | 3 minutes 15 seconds | 38° C. |
| Bleaching | 45 seconds | 38° C. |
| Fixing | 1 minute 30 seconds | 38° C. |
| Stabilizing | 1 minute | 38° C. |
| Drying | 1 minute | 55° C. |

| "Color Developer" | |
|---|---|
| Water | 800 cc |
| Potassium carbonate | 30 g |
| Sodium bicarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(βhydroxyethyl)-aniline sulfate | 4.5 g |
| Diethylenetriaminepentaacetic acid | 3.0 g |
| Potassium hydroxide | 1.2 g |
| Water to make | 1 liter |

The pH is adjusted to 10.06 using potassium hydroxide or 20% sulfuric acid.

| "Bleaching Solution" | |
|---|---|
| Water | 700 cc |
| 1,3-Diaminopropanetetraacetic acid ferric ammonium | 125 g |
| Ethylenediaminetetraacetic acid | 2 g |
| Sodium nitrate | 40 g |
| Ammonium bromide | 150 g |
| Glacial acetic acid | 40 g |
| Water to make | 1 liter |

The pH is adjusted to 4.4 using aqueous ammonia or glacial acetic acid.

| "Fixing Solution" | |
|---|---|
| Water | 800 cc |
| Ammonium thiocyanate | 120 g |
| Ammonium thiosulfate | 150 g |
| Sodium sulfite | 15 g |
| Ethylenediamnetetraacetic acid | 2 g |

After adjusting the pH to 6.2 using aqueous ammonia or glacial acetic acid, the total volume is adjusted to 1 liter by adding water.

| "Stabilizer" | |
|---|---|
| Water | 900 cc |
| Paraoctylphenyl polyoxyethylene ether (n = 10) | 2.0 g |
| Dimethylolurea | 0.5 g |
| Hexamethylenetetramine | 0.2 g |
| 1,2-Benzoisothiazoline-3-one | 0.1 g |
| Siloxane | 0.1 g |
| Aqueous ammonia | 0.5 cc |
| Water to make | 1 liter |

The pH is adjusted to 8.5 employing aqueous ammonia or 50% sulfuric acid.

Furthermore, the molding material of the present invention is preferably comprised of at least 50 percent of a cellulose based fiber. Said cellulose based fiber is preferably comprised of a natural fiber, and the cellulose based fiber is preferably composed of only natural fibers.

The natural fibers as described in the present invention include vegetable fibers as well as animal fibers. The vegetable fibers imply any natural cellulose fibers obtained from wood fiber, stalk fiber, vein fiber, phloem fiber, seed fiber, and the like.

Listed as animal fibers may be silk and fibroin fiber from raised silkworms and field silkworms (for instance, tensan, sakusan, erisan, or the like), fibers from animals such as fibers from sheep wool and cashmere, fiber of camel wool, fiber of goat wool, fiber of alpaca wool, and fiber-like substances forming animal skin. The present invention is not limited to the examples of the fibers described herein.

Furthermore, all the natural fibers are preferably comprised of vegetable fibers. In addition, the natural fibers are preferably pulp.

The pulp as described in the present invention is a fiber extracted from plants, which is employed for paper making, and the main component of the fiber for paper making is cellulose. The chemical composition of the plant is rather complex. However, it is comprised of three main components of cellulose, hemicellulose and lignin. Other components include a small amount of protein and ash, such as silica and the like.

The vegetable fiber as described in the present invention means a fiber possessed by plant, and represents those obtained by directly drying the plant and those commonly marketed as pulp. Production methods of pulp include chemical pulping methods such as a Kraft pulping method, a sulfite pulping method, an alkali pulping method, and the like, and the pulp is bleached through a multi-step bleaching method. Furthermore, employed may be pulp itself or chemically treated pulp employing a crosslinking reaction or a mercerization reaction, known in the art.

Listed as raw materials employed in the aforementioned pulp production methods are needle-leaf trees such as pine, sugi (Japanese cedar), hinoki (Japanese cypress), and the like, broadleaf trees such as Japanese beeches, chinquapins, eucalyptuses, and the like, non-wood fibers such as flax, kozo or paper mulberry, mitsumata, bamboo, bagasse, and the like. However the present invention is not limited to these. Furthermore, in the proposition and the like on global environmental issues related to forest resources, the recycling of paper resources has been actively promoted. In such situations, those paper resources recycled as waste paper pulp may be employed which are produced in such a manner that used sheets of paper such as newspapers, weeklies, magazines, leaflets, which are collected from homes, firms and train stations, and paper trim waste, waste sheets and the like generated in bookbinding and printing plants are recycled through process of disaggregation, roughing, ripening, ink removal, cleaning, bleaching, and the like.

Plant materials for non-wood pulp production include not only true grasses but also herbaceous plants which do not form xylem in the part above the ground as well as all others generally called non-wood in the pulp industry. Listed as such plant materials may be, for example, shoot, flax, western flax, hemp which are composed of phloem fibers; ditch reed, sabai, esparto, rice plant, wheat, barley, rye, sugar cane, bagasse, and the like which are composed of stiff fibers; cotton, kapok, coconut husk, and the like which are composed of seed coverings; carnauba palm leave, Manila hemp, saizaru hemp, and the like which are composed of leaf fibers. Further, included are kozo or paper mulberry, mitsumata, unsized silk, mulberry, bamboo, rags which have been produced in a small scale as the raw materials for pulp.

As a useful non-wood pulp, kenaf pulp is preferably employed in the present invention. The kenaf is an annual plant cultivated in Thailand, China, Australia, and the like, and has attracted attention as a raw material for paper making pulp which may be employed instead of wood. In the 1950s, the United States Department of Agriculture first started an investigation on the application of kenaf. Since then, basic research as well as industrial research has been made, and a number of proposals have been presented. For example, in Japanese Patent Publication No. 2-42952, proposes to achieve an object to improve the insufficient surface smoothness possessed by a thick-walled fiber, by employing a kenaf chemical pulp together with a thick-walled fiber pulp. Furthermore, Japanese Patent Publication Open to Public Inspection No. 2-91297 proposes to accomplish a purpose to enhance the performance of a mechanical pulp by employing a kenaf pulp together with the mechanical pulp. Further, Japanese Patent Publication Open to Public Inspection Nos. 2-88286 as well as 2-92576 proposes to achieve a purpose to obtain a thermal printing sheet and paper for a pressure-sensitive copying sheet by employing kenaf pulp together with ordinary pulp. Still further, in Japanese Patent Publication Open to Public Inspection Nos. 6-262868 proposes to achieve an object to obtain a thermal transfer receiving paper.

In the present invention, an object of employing a helmilase enzyme, for example, a hemicellurasexylan decomposing enzyme is to decompose the xylan part of ligno cellulose, which is thought to bond white cellulose to brown lignin.

Accordingly, the decomposition of xylanhemicellulose enhances the elimination of lignin and increases the whiteness of said fiber.

Xylan decomposing enzyme called hemicellulase is commonly employed in paper/pulp industry, starch/baking industry, and the like.

Employed as the xylan decomposing enzymes may be those originated from microorganisms, animals, plants, and the like, and refined and unrefined products may be employed. These enzymes may be employed individually or in combination and may be successively. The added amount is between 0.01 and 10 percent by weight based on the dried weight of the fiber source.

The xylan decomposing activity of an enzyme may be examined employing the method described below as a simplified method. Namely, commercially available xylan (Sigma Co.), derived from oats, is suspended in an aqueous solution adjusted to optional pH so that the concentration is one percent by weight. After agar is added to obtain a concentration of 2 percent by weight, the resulting mixture is heated to between 90 and 100° C., and an agar plate is prepared. The enzyme liquid is suitably diluted or concentrated, and the resulting liquid is spotted onto the agar plate. The spotted agar plate is maintained at optional temperature. After 24 hours, the agar plate is observed. When a clear zone is observed around the spotted area, it is judged that the enzyme has a xylan decomposing activity.

During an enzyme treatment, the concentration of raw material is generally between 0.1 and 20 percent by weight, and is preferably between 1 and 10 percent by weight. The more the pH and temperature conditions approach the optimum conditions of decomposition activity, the more effective results are obtained. However, it is unnecessary to stick to those, and conditions may be employed in any range in which the enzyme is allowed to work. Generally, conditions may be selected from a pH range of 3 to 11 and a temperature range of 10 to 90° C. The treatment time depends on the treatment pH, the treatment temperature, and the amount of enzyme. Furthermore, it also depends on the type of raw materials such, as rice straw, wheat straw, bagasse, and the like and the degree of the pretreatment. When the treatment is carried out while stationary or being slowly stirred, the required treatment time is one hour at the shortest and about 10 days at the longest. Enzyme treatment conditions may be determined while considering the limitations in the practical production. It is desirous to set the optimal conditions after carrying out a preliminary test.

Furthermore, when in order to decompose oils, fats, or proteins incorporated in a raw material, an oil or fat decomposing enzyme, as well as a protein decomposing enzyme, is allowed to work in advance or at the same time, pulping may be more readily carried out. It is not preferred to employ a cellulose decomposing enzyme because such enzyme decomposes the fiber itself and decreases the yield as well as the strength of the pulp. However, for example, if the strength of the pulp is not critical, pulping may be readily carried out by allowing the cellulose decomposing enzyme to work prior or simultaneously. In such cases, the nearer the optimal conditions of decomposition activity from the characteristics of an employed enzyme approaches, the more effective are the results obtained. However, it is not required to stick to those, and any range may be employed in which the enzyme is allowed to react.

A raw material which has been subjected to enzyme treatment is often not yet in a state to be directly constituted into paper because fibers are still aggregated or non-fiber materials are still attached. Therefore, disaggregation as well as beating is carried out, and fibers are well separated and collected. The disaggregation as well as beating may be carried out employing a pulper, a beater, a refiner, a PFI mill, and the like. Disaggregation, as well as beating, is preferably carried out in alkali conditions with the purposes of allowing the material organization to swell further and of extracting lignin. However, said conditions are not to be limited. Further, in order to carry out those in the alkali conditions, it is preferred to employ a method in which a raw material is immersed into an alkali solution prior to carrying out the enzyme treatment. The alkali solution after use can allow to immerse subsequent raw material and can be repeatedly employed. Thus much less effluent is generated compared to conventional soda methods.

Separation may be carried out employing a rotating sieve, a flat screen, a pressure screen, and the like. Fiber portions and non-fiber portions are effectively separated by employing the same or different types of sieves in two or more levels.

Thereafter, pulp for paper and paper board may be prepared upon reduction bleaching and/or oxidation bleaching in accordance with conventional methods as required. For example, the reduction bleaching is carried out in such a manner that in the range of a pulp concentration of 3 to 5 percent, a pH of 5 to 6, and a temperature of 50 to 65° C., sodium hydrosulfite is added in an amount of 0.5 to 1.0 percent by weight with respect to dry pulp, and the resulting mixture is processed for 0.5 to 1.0 hour.

Furthermore, oxidation bleaching may be carried out employing chlorine water, sodium hypochlorite, chlorine dioxide, hydrogen peroxide, and the like. For example, when sodium hypochlorite is employed, processing is carried out for 2 to 6 hours under a pulp concentration of 3 to 5 percent, a temperature of 25 to 50° C., and an effective chlorine concentration of 2 to 9 percent. The oxidation bleaching is preferably carried out employing two or more types of compounds and a multi-step process. When compounds containing chlorine such as sodium hypochlorite, chlorine water, chlorine dioxide, and the like, are employed, an alkali extraction operation is preferably included.

The length of the natural fibers in the present invention is an average length of the fiber kneaded into a thermoplastic resin, and in the present invention, is preferably between 0.3 and 3.0 mm. Furthermore, cellulose based fibers (preferably natural fibers) having a water content of no more than 5 percent are preferably employed as raw material.

Employed as vegetable fibers may be various types of natural pulp. However in terms of strength, unbleached pulp is preferred irrespective of the origin of needle-leaf trees or broadleaf trees. Furthermore, from economical and environmental aspects, used Kraft paper waste, corrugated board paper waste, paper waste, such as newspapers, magazines, and the like may be employed.

Into a mixture comprised of a vegetable fiber and a thermoplastic resin in the present invention, optionally incorporated may be various additives, for instance, inorganic pigments such as carbon black and the like, organic pigments, light shielding materials such as a light shielding cellulose fiber and the like, lubricants, and the like.

However, only a mixture comprised of a cellulose based fiber and a thermoplastic resin can fully achieve the object of the present invention.

The thermoplastic resins employed in the present invention are those which are comprised of no halogen atoms and exhibit fluidity upon heating. Specific examples include natural rubber, acrylate rubber, butyl rubber, nitrile rubber, butadiene rubber, isoprene rubber, styrene-butadiene rubber, urethane rubber, silicone rubber, acrylic rubber, neoprene rubber, epichlorhydrin, EPDM (ethylene-propylene-diene rubber), elastomers such as urethane elastomer and the like, polyethylene, polypropylene, polybutadiene, polybutene, shock-resistant ABS resin, polyurethane, ABS resin, cellulose acetate, amide resin, nitrocellulose, polystyrene, epoxy resin, phenol-formaldehyde resin, polyester, shock-resistant acrylic resin, ethylene-vinyl acetate copolymer, acrylonitrile-butadiene copolymer, polyvinyl acetate, and the like. Preferred as thermoplastic resins are polyolefin based resins such as polyethylene resins, polypropylene resins, polyethylene-vinyl acetate copolymers, which are not likely to generate toxic gasses except for carbon dioxide gas and water during incineration. Of polyethylenes, ethylene-$\alpha$-olefin copolymers are preferred which have a density in the range of 0.86 to 0.94 $g/cm^3$, a melt index in the range of 0.01 to 40 g/10 minutes, and a main peak of DSC melting point of 50 to 115° C. Particularly preferred are ethylene-$\alpha$-olefin copolymers prepared employing a metallocene catalyst as a polymerization catalyst. More preferably employed are copolymers of ethylene with 4-methylpentene, 1-hexene, or 1-octene 1 as $\alpha$-olefin, which are prepared employing a metallocene catalyst as a copolymerization catalyst, and have a density of 0.89 to 0.92 $g/cm^3$, and a melt index of 5 to 25 g/10 minutes. Preferred are those which are obtained by copolymerizing 9 to 30 percent by weight of ethylene with $\alpha$-olefin in an amount to make the total percent by weight 100. The mix ratio of a vegetable fiber to a thermoplastic resin is preferably between 50 and 90 percent by weight from the aspects of injection molding properties, strength, and hardness, and is most preferably between 55 and 75 percent by weight. The production methods of molding mixtures comprised of a vegetable fiber and a thermoplastic resin are not particularly limited and any of several methods known in the art may be employed. For example, those obtained by shearing pulp, waste paper, and the like into pieces employing a shearing machine and a thermoplastic resin are well mixed at a temperature of at least 10° C. higher than its melting point, and the resulting mixture is used to mold the desired parts.

In a thermoplastic composition comprised of at least 50 percent of the natural fiber of the present invention, as well as a thermoplastic resin, preferably employed as the thermoplastic resin, is a polyolefin based resin. The polyolefin based resin as described herein denotes a resin comprising a large portion of polyolefin and mainly exhibiting properties of a polyolefin resin, and polyolefin may be employed individually or in combination.

Namely, the polyolefin based resins include an individual chemically modified polyolefin (hereinafter referred to as a modified polyolefin), or those prepared by combining the modified polyolefin with an unmodified polyolefin resin (hereinafter referred to as polyolefin resin, and separated from the polyolefin based resin), further include those combined with thermoplastic rubber such as polyolefin elastomer, and the like.

Namely, the polyolefin resins or polyolefin based resins preferably employed in the present invention imply polymers comprising polyolefin as the main component and resins comprised of mixtures thereof, and the like. It does not really matter that those are olefin homopolymers, copolymers of olefin with the other olefin, various copolymers with other monomers, others such as differences (straight chain, branched chain, stereoscopic regularity, and the like) in chemical structures, and the like.

Generally employed as the polyolefin resins are polypropylene having an isotactic structure as the main component, low density or high density polyethylene, copolymers of these with olefin other than these, and mixtures thereof. Specifically employed are the aforementioned polypropylene homopolymer resins, polypropylene copolymer resins, or resins comprised of polypropylene as the main component.

Furthermore, the modified polyolefins as described herein are those in which polyolefin resins are allowed to have a polar group in order to obtain a firm bond of the polar group of a vegetable fiber comprising cellulose as the main component with the polyolefin resin. Preferably employed as the polar group are carboxylic acids or anhydrides thereof. In order to introduce these polar groups, preferably employed are monocaroxylic acids, polycarboxylic acids, or anhydrides thereof. Preferably employed as dicarboxylic acids or anhydrides thereof may be listed, for example, maleic acid, fumaric acid, maleic anhydride, or alicyclic dicarboxylic acids or anhydrides thereof which have a cis type double bond in the ring, for example, cis-4-cyclohexane-1,2-dicarboxylic anhydride (generally called tetrahydrophtalic anhydride), cis-4-cyclohexane-1,2-dicarboxylic acid (generally called tetrahydrophthalic acid), endo-bicyclo(2,2,1)-5-heptene-2,3-dicarboxylic acid (generally called himic acid), endo-bicyclo(2,2,1)-1,2,3,4,7-hexachloro-2-heptene-5,6-dicarboxylic anhydride (generally called chlordenic anhydride), endo-bicyclo(2,2.1)-hexachloro-2-heptene-6,6-dicarboxylic acid (generally called chlordenic acid), and the like.

Accordingly, polyolefin based resin compositions preferably exhibit high fluidity, either when polyolefin resins are employed alone, or when those are combined with modified polyolefin, polyolefin elastomer and the like with the purpose of the enhancement of mechanical properties.

In the present invention, a thermoplastic composition preferably has a melt index (occasionally referred to as MI) of 20 to 100. Said MI is an index measured by Condition 4 in Table 1 in JIS K7210 or conditions in Table 1 in ASTMD 1238, both conditions being well known in this industry.

Thermoplastic resins are not particularly limited. However, when environmental adaptability as waste, which is one of the objects of the present invention, is to be taken into account, polyethylene resins and polyethylene-vinyl acetate copolymers are preferred which generate no toxic gas during incineration.

Furthermore, a molding material preferably comprises at least one selected from the compounds represented by general formulas (I) through (V) or tetramethylolcyclohexanol.

Next, the compounds represented by general formulas (I) through (V) will be described.

In general formula (I), $R_1$ represents a hydrogen atom, an alkyl group, an aryl group, an alkoxy group, an acylamino group, or an amino group, and $R_2$ represents a hydrogen atom, an alkyl group, an aryl group, an acyl group, an alkoxycarbonyl group, a carbamoyl group, an amino group, or an amidino group. Furthermore, $R_1$ and $R_2$ may bond to form a ring. Further, these groups may have a substituent. X represents —$CH_2$— or —NH—.

In general formula (II), $R_3$, $R_4$ and $R_5$ may be the same or different, and each represents a hydrogen atom, an alkyl group, an alkenyl group, an aralkyl group, an aryl group, or an acyl group.

$R_6$ and $R_7$ each represents a hydrogen atom or an alkyl group (listed as examples are the similar groups to those described for $R_3$, $R_4$, and $R_5$).

Compounds represented by general formula (II) include polymer-shaped compounds, which bond to a polymer chain (for instance, a polyethylene chain and a polypropylene chain) via a group represented by $R_3$, $R_4$, and $R_5$. Further, in this case, said compounds included those in which —CO—, —COO—, —CONH— and the like, as a linkage group, form a polymer chain with the group of $R_3$, $R_4$, and $R_5$.

In general formula (III), $R_8$ represents a hydrogen atom, an alkyl group, or an aryl group. Furthermore, $R_8$ may be a group which forms naphthalene ring together with a phenyl ring. Said alkyl group and aryl group include those having a substituent. "n" represent an integer of 2 to 4.

In general formula (IV), $R_9$ represents a hydrogen atom or a substituent. Cited as substituents are, for example, an alkyl group, an aryl group, a cycloalkyl group, an acyl group, a carbamoyl group, a sulfamoyl group, and an alkoxycarbonyl group. These groups may further have a substituent (for example, a carboxyl group, a sulfo group, a hydroxyl group, an amino group, and the like).

$R_{10}$ represents a hydrogen atom or a substituent. Cited as substituents are, for example, an alkyl group, an aryl group, a cyano group, a carbamoyl group, a carboxyl group, an alkoxycarbonyl group, an acyl group, a haloalkyl group, a nitro group, a sulfamoyl group, an alkylsulfamoyl group, an alkylsulfonyl group, and the like.

In general formula (V), $R_{11}$ and $R_{12}$ each represents a hydrogen atom or a substituent, and $R_{13}$ represents a hydrogen atom or an alkyl group. Z represents a hydrogen atom, an alkyl group, an aryl group, —$SO_2R_{14}$, or —$SO_2N(R_{14})$ ($R_{15}$). $R_{14}$ represents an alkyl group, an aryl group, or a heterocyclic ring group, and $R_{15}$ is as defined above for $R_{13}$. Furthermore, $R_{13}$ and Z may be joined together to form a ring.

Cited as examples of substituents represented by $R_{11}$ are a straight or branched alkyl group having from 1 to 18 carbon atoms, a cycloalkyl group having from 5 to 7 carbon atoms, an aryl group, a 5-membered or 6-membered heterocyclic ring group, or —$SO_2R_{16}$, —$SO_2N(R_{16})$ ($R_{17}$), —$COR_{16}$, —$CON(R_{16})$ ($R_{17}$), —$COOR_{16}$, —$CONHNHR_{18}$, —$C(=NH)NH_2$, —$CSNHR_{18}$, —$CSNHNHR_{18}$ (wherein $R_{16}$ represents an alkyl group, an aryl group, or a heterocyclic ring group, $R_{17}$ represents a hydrogen atom or an alkyl group, and $R_{18}$ represents a hydrogen atom, an alkyl group, an aryl group, or a heterocyclic ring group).

These substituents may further have a substituent. Listed as examples of these substituents are an alkyl group, an acylamino group, a sulfonamido group, a carbamoyl group, a sulfamoyl group, an alkoxycarbonyl group, a nitro group, a cyano group, a hydroxyl group, a carboxyl group, a sulfo group, a halogen atom, and the like. Of these, a sulfo group, a carboxyl group, and a hydroxyl group are most preferred.

Preferred as $R_{11}$ are a hydrogen atom, an alkyl group, an aryl group, an alkylsulfonyl group, an acyl group, a carbamoyl group, and an alkoxycarbonyl group.

Cited as examples of substituents represented by $R_{12}$ are a straight or branched alkyl group having from 1 to 18 carbon atoms, a cycloalkyl group having from 5 to 7 carbon atoms, an aryl group, an aryl group, an alkoxy group, an aryloxy group, an alkoxycarbonyl group, an aryloxycarbonyl group, a carbamoyl group, an acyl group, an amino group, an alkylamino group, an arylamino group (for example, an anilino group and the like), an acylamino group, a sulfonamido group, a carbamoylamino group, a sulfamoylamino group, an alkoxycarbonylamino group, a cyclic amino group, a carboxyl group, a cyano group, or the like.

These substituents may further have a substituent. Cited as examples of these substituents are ones, which are the similar to those described in $R_{11}$. Preferred as $R_{12}$ are a hydrogen atom, an alkyl group, an alkoxy group, an alkoxycarbonyl group, a carboxyl group, an acylamino group, a carbamoylamino group, a sulfonamido group, a sulfamoylamino group, and an alkoxycarbonylamino group, and those particularly preferred are an alkyl group, an acylamino group, a carbamoylamino group, a sulfonamido group, and an alkoxycarbonylamino group.

Listed as examples of alkyl groups represented by $R_{12}$ are straight or branched alkyl groups having from 1 to 18 carbon atoms. These may further be substituted with a halogen atom, an alkoxy group, an aryloxy group, an acylamino group, a sulfonamido group, a carbamoyl group, a sulfamoyl group, an alkoxycarbonyl group, a nitro group, a cyano group, a hydroxyl group, a carboxyl group, a sulfo group, an amino group, an alkylamino group, a dialkylamino group, and the like.

Z represents a hydrogen atom, an alkyl group, an aryl group, —$SO_2R_{13}$, or —$SO_2N(R_{14})(R_{15})$ (wherein $R_{14}$ represents an alkyl group, an aryl group, or a heterocyclic ring group, and $R_{15}$ is as defined above for $R_{13}$). Cited as these examples are a methyl group, an ethyl group, a butyl group, a methoxymethyl group, a cyanoethyl group, a phenyl group, a methylsulfonyl group, an ethylsulfonyl group, a butylsulfonyl group, benzenesulfonyl group, a dimethylsulfamoyl group, a diethylsulfamoyl group, and the like. Z is preferably an alkyl group or an alkylsulfonyl group.

Representative examples of compounds represented by general formulas (I) through (V) are illustrated below, however the present invention is not limited these.

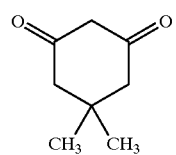
I-1

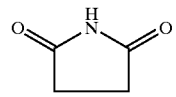
I-2

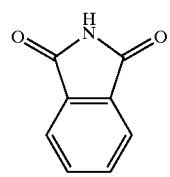
I-3

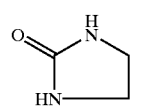
I-4

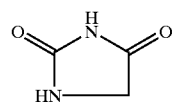
I-5

-continued

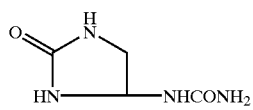
I-6

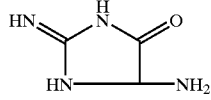
I-7

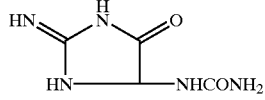
I-8

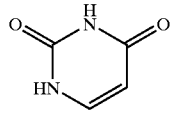
I-9

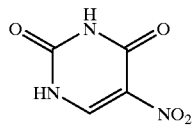
I-10

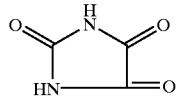
I-11

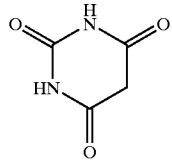
I-12

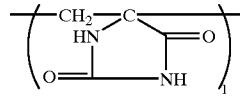
I-13

$NH_2CONHNH_2$
I-14

$CH_3COCH_2COCH_3$
I-15

$NH_2CONHC_2H_5$
I-16

$CH_3CONHCONH_2$
I-17

$CH_3CONHCONHCH_3$
I-18

$C_2H_5NHCONHNH_2$
I-19

$CH_3CONHCONHCOCH_3$
I-20

$NH_2CONH(CH_2)_2NHCONH_2$
I-21

$NH_2CONHCH_2NHCONH_2$
I-22

$CH_3COCH_2COOC_2H_5$
I-23

$C_2H_5OCOCH_2COOC_2H_5$
I-24

-continued
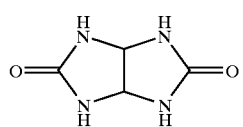
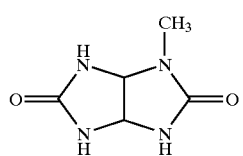
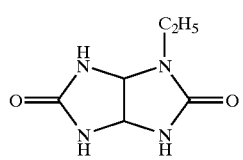
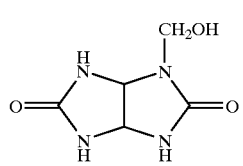
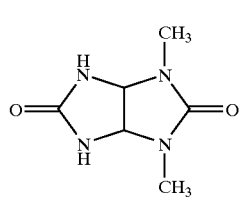
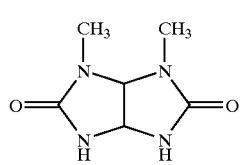
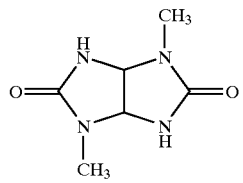
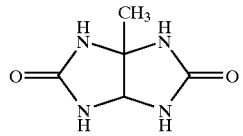
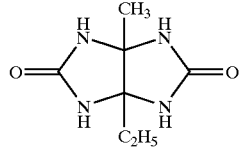
-continued
II-1
II-2
II-3
II-4
II-5
II-6
II-7
II-8
II-9
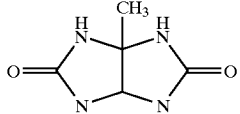
II-10
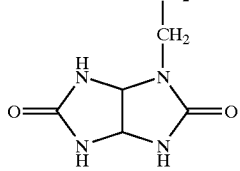
II-11
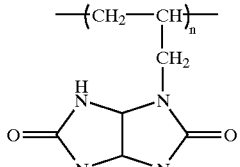
III-1
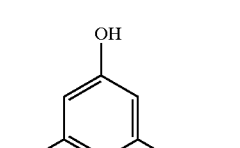
III-2
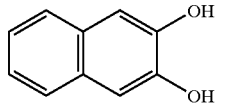
III-3
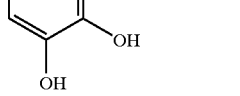
IV-1
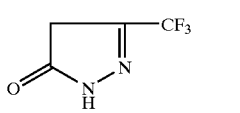
IV-2
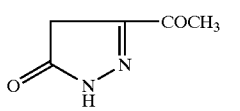
IV-3
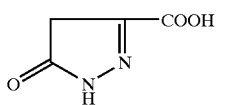
IV-4
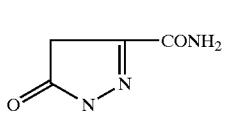
IV-5
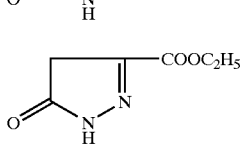

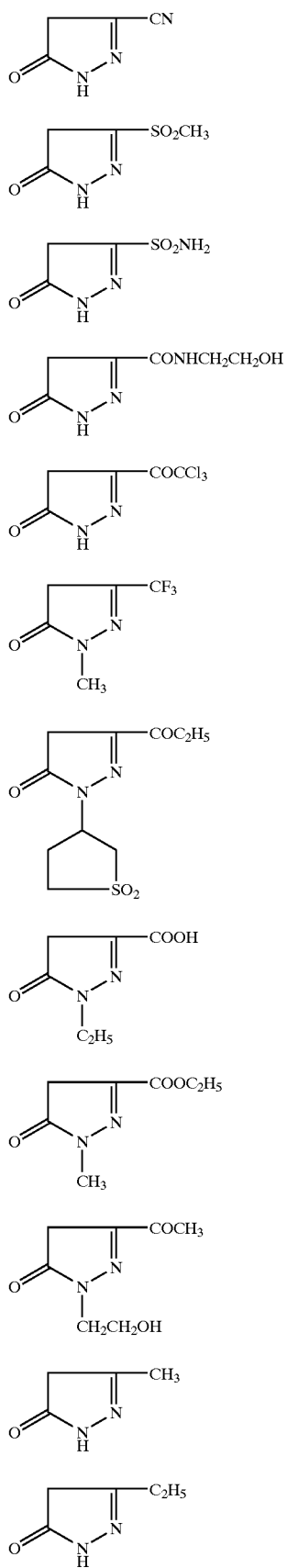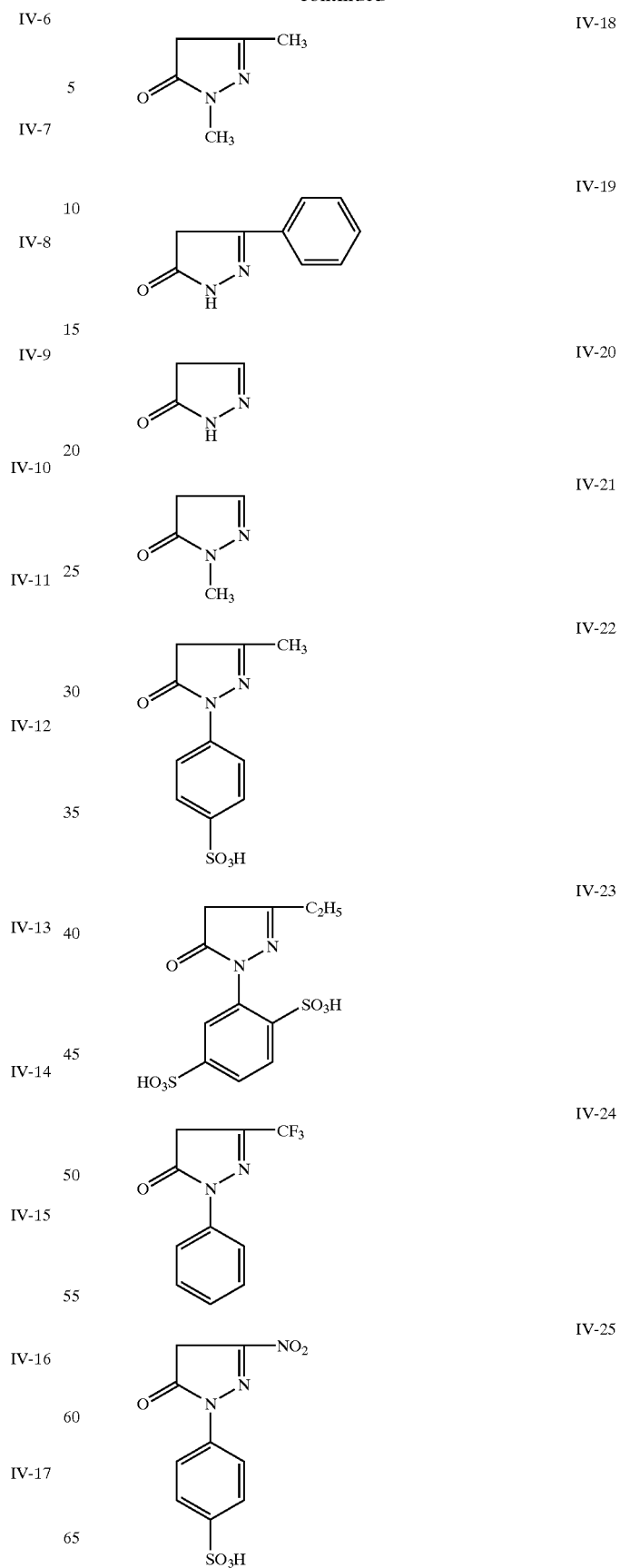

-continued
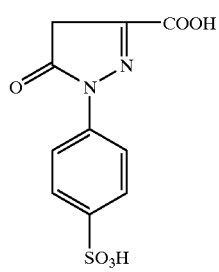
IV-26
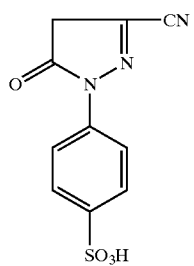
IV-32
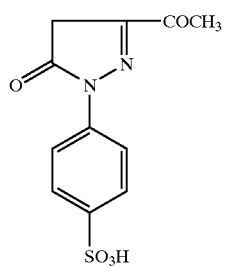
IV-27
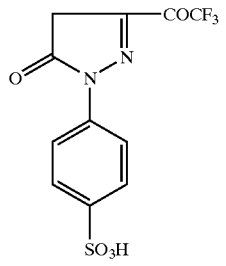
IV-33
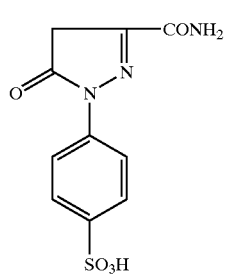
IV-28
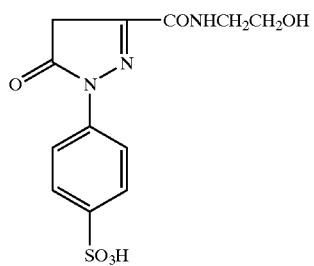
IV-34
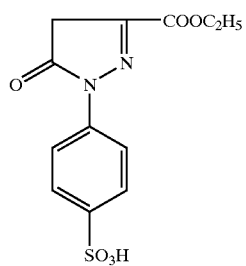
IV-29
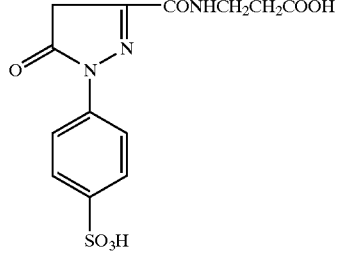
IV-35
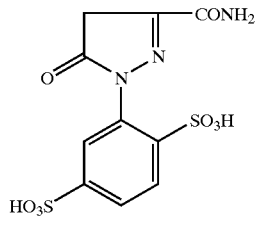
IV-30
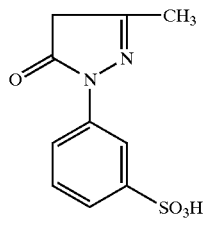
IV-36
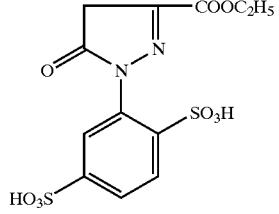
IV-31
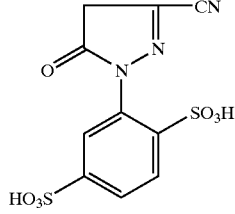
IV-37

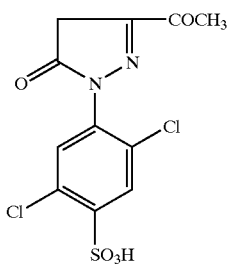
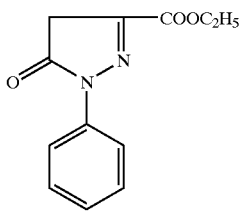
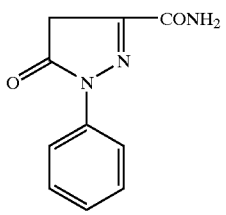
V-1
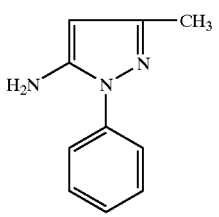
V-2
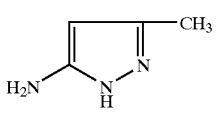
V-3
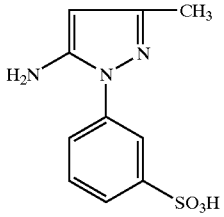
V-4
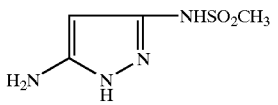
V-5
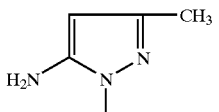
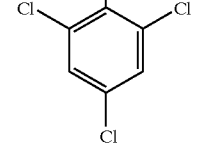
IV-38
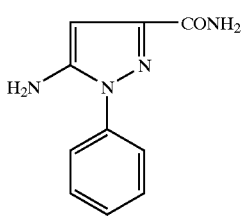
IV-39
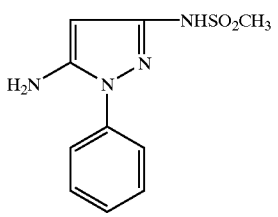
IV-40
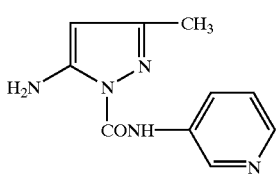
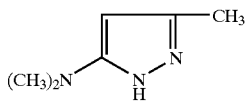
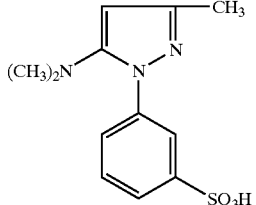
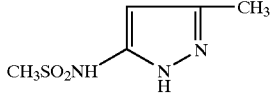
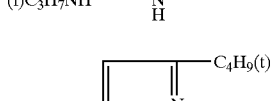
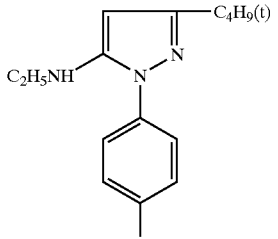
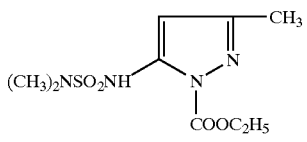
V-6
V-7
V-8
V-9
V-10
V-11
V-12
V-13
V-14

-continued

V-15 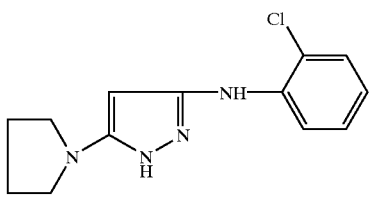

V-16 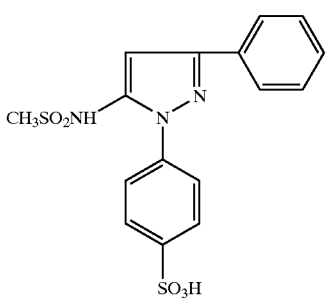

V-17 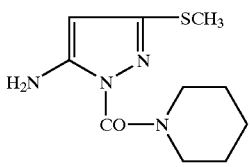

V-18 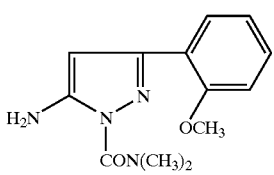

V-19 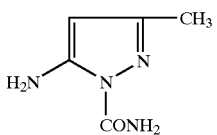

V-20 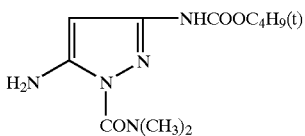

V-21 

V-22 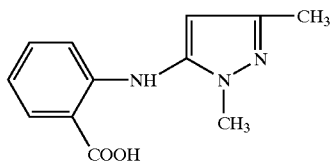

V-23 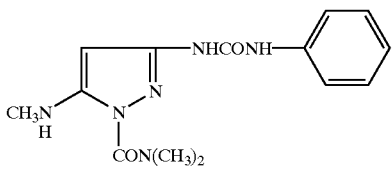

-continued

V-24 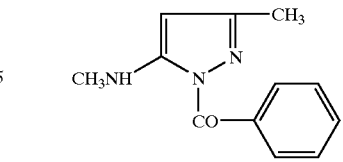

Many compounds described above are commercially available, and those, which are not commercially available, may readily be synthesized according to methods described in patents and publications shown below.

Compounds I-7 and I-8 can readily be synthesized according to methods described in Bulletin of the Chemical Society of Japan, Volume 39, pages 1559 to 1567, 1734 to 1738 (1966), Chemische der Berichte, Volume 54, pages B1802 to 1833, 2442 to 2479 (1921), Beilstein Handbuch der Organischen Chemie, page H98 (1921), and the like.

Compound I-13 is an oligomer or polymer having one repeating unit.

Compound I-19 can be synthesized according to a method described in Beilstein Handbuch der Organischen Chemie (which is described above), First Enlarged Edition Volume 4, page 354, the same Volume 3, page 63 and the like.

Compounds II-1 and II-11 can be synthesized according to methods described in British Patent No. 717,287, U.S. Pat. Nos. 2,731,472 and 3,187,004, H. Pauly, Chem. Ber., 63B, page 2063 (1930), F. B. Slezak, J. Org. Chem., 27, pages 2 to 181 (1962), J. Nematollahl, J. Org. Chem., 28, page 2378 (1963), and the like. Furthermore, by allowing glycoluril to undergo alkylation, acylation, hydroxymethylation, alkoxymethylation, halomethylation, and the like, corresponding alkyl, acyl, hydroxymethyl, alkoxymethyl and halomethyl derivatives are obtained.

Compounds IV-1 through IV-30 can readily be synthesized according to methods described in Japanese Patent Publication Open to Public Inspection Nos. 51-77327 and 62-273527, British Patent 585,780, and the like.

Compounds V-1 through V-24 can readily be synthesized in accordance with methods described in Berichte der Deutschen Chemischengesellschaft 57, page 332 (1924), Annalen der Chemie, 52, page 622 (1936), ibid., 397, page 119 (1913), ibid., 568, page 227 (1950), Journal of the American Chemical Society, 734, page 664 (1951), and the like.

Of these, I-1 (dimedone) and tetramethylolcyclohexanol are particularly preferred.

A phenol resin may further be added in addition to these compounds.

Namely polyolefin resins or polyolefin based resins preferably employed in the present invention imply copolymers comprised of polyolefins as the main component and resins comprised of mixtures thereof. Olefin homopolymers, copolymers of olefin with another olefin, or various copolymers of olefin with other monomers, and others having different chemical structures (straight chain, branched chain, stereoscopic regularity, and the like) are not concerned.

In polyolefin resins, commonly and preferably employed are polypropylenes having an isotactic structure as the main structure, low density or high density polyethylenes, copolymers of olefin with one other than the above, and mixtures thereof. Specifically, the aforementioned polypropylene homopolymer resins, polypropylene copolymer resins or resins comprised of polypropylene as the main component are preferably employed.

Furthermore, the modified polyolefins as described herein are those in which polyolefin resins are allowed to have a polar group in order to allow the polar group of a vegetable fiber comprising cellulose as the main component to firmly bond to the polyolefin resin. Preferably employed as the polar group are carboxylic acids or anhydrides thereof. In order to introduce these polar groups, preferably employed are monocaroxylic acids, polycarboxylic acids, or anhydrides thereof. Preferably employed as dicarboxylic acids or anhydrides thereof may be listed, for example, maleic acid, fumaric acid, maleic anhydride, or alicyclic dicarboxylic acids or anhydrides thereof which have a cis type double bond in the ring, for example, cis-4-cyclohexane-1,2-dicarboxylic anhydride (generally called tetrahydrophtalic anhydride), cis-4-cyclohexane-1,2-dicarboxylic acid (generally called tetrehydrophthalic acid), endo-bicyclo(2, 2,1)-5-heptene-2,3-dicarboxylic acid (generally called himic acid), endo-bicyclo(2,2,1)-1,2,3,4,7-hexachloro-2-heptene-5,6-dicarboxylic anhydride (generally called chlordenic anhydride), endo-bicyclo(2,2.1)-hexachloro-2-heptene-6,6-dicarboxylic acid (generally called chlordenic acid), and the like.

In order to uniformly knead at least 50 percent of a natural fiber with a thermoplastic resin, it is possible to employ devices and methods such as a high speed fluid mixer, an extruder, and combinations thereof, as they are, which are generally used to knead a resin with a filler. However, in order to allow a cellulose fiber to exhibit its features, methods are preferred which results in good dispersion of fibers and results in neither damage nor carbonization of the fiber. For such reasons, a petroleum- resin, rosin or a rosin derivative is preferably incorporated into a molding material in an amount of 0.1 to 40 percent by weight of the total weight.

Rosin as described herein denotes a representative one which is obtained by steam-distilling a pine resin to remove its volatile turpentine oil. In the present invention, employed may be its derivatives such as hydrogenated compounds, disproportionated compounds, glycerin esters, maleic acid modified parts, and the like. These have a softening point or a melting point of 50 to 130° C.

The petroleum resin is a resin prepared by polymerizing an unsaturated hydrocarbon mixture obtained during petroleum refining, cracking and the like in the presence of a catalyst, and has a melting point of about 60 to about 120° C. In such respect, the petroleum resin has physical properties similar to the rosin or derivatives thereof. Further, employed as plasticizers may be those for polyolefin. For example, butyl stearate as well as polyisobutylene is representative and in addition, employed may be phthalic acid esters of higher alcohols, which are plasticizers for vinyl chloride resins.

Incorporated as other additives into the thermoplastic composition may be compounds described below.

Employed as inorganic fillers may be those commonly used such as calcium carbonate, magnesium silicate, aluminum silicate, barium sulfate, calcium sulfate, and the like, and those having an average particle diameter of no more-than 10 $\mu$m are preferred. Employed as synthetic rubber are ethylene-propylene rubber (EPR), third component containing ethylene-propylene terpolymer, butyl rubber, polybutadine rubber, and the like. In order to uniformly mix the polyolefin based resin with the aforementioned various additives, devices and methods generally employed to mix a resin with a filler, such as a Banbury mixer, a roll mixer, a kneader, an extruder, a high speed rotary mixer, and combinations thereof, may be directly employed without any modifications. In the mixture prepared by combining a polyolefin resin only with a vegetable fiber without adding rosin and plasticizers, uniform dispersion of the vegetable fiber is fairly difficult, and the affinity between the polyolefin resin and the vegetable fiber is small. As a result, the strength and the like degrade and the uniformity of product quality is lost. Thus commercially viable materials are not obtained. In this case, it is possible to improve the strength as well as the uniformity of product quality to a certain level by decreasing the combined amount of the vegetable fiber. However, it is difficult to fully achieve the desired objects due to a decrease in rigidity, heat resistance, painting properties, and the like. In order to improve dispersibility of the vegetable fiber to increase its combining power with the polyolefin based resin and to increase the combined amount of the vegetable fiber, the combination of rosin or, its analog, and a plasticizer in the composition of the present invention is extremely important.

Furthermore, as a molding material, it is desirous that after 1 gram of the molding material is kept standing at ambient conditions of 23° C. and 55 percent RH for 24 hours, the resulting material is placed into a 30-cc vessel and sealed tightly, and when the vessel is heated for 30 minutes in an oil bath maintained at 120° C., the amount of furfural generated in the vessel is no more than 10 $\mu$g/g of the molding material.

Based on the aforementioned constitution, the fog minimizing effect as well as the offensive odor minimizing effects becomes more marked, and in addition, such effects may be readily achieved. Furthermore, it is preferred to decrease the amount of hemicellulose in a cellulose based fiber, to set washing conditions for the cellulose based fiber, or to set kneading conditions such as the kneading temperature and the like of a thermoplastic resin with a cellulose based fiber so as to satisfy the aforementioned constitution. The kneading temperature is preferably between 70 and 150° C., and is more preferably between 70 and 120° C.

Furthermore, as a molding material, when 0.3 gram of the aforementioned molding material is combusted at a temperature of 850° C. and an air flow rate of 300 ml/minute in a tube-shaped electric furnace in accordance with JIS K 2541, combustion heat detected by a calorimeter specified in JIS M 8814 is preferably between 5,000 and 8,000 cal/g.

Furthermore, employed as a molding material is a test piece (having two holes with a diameter of 5 mm and a distance of 11 mm between the hole centers) obtained by machining the aforementioned molding material having length 114 mm×width 33 mm×thickness 10 mm into a compact tension shape in accordance with ASTM-D5045 Standard. A tool is inserted between the aforementioned two holes in accordance with ASTM-D5045 Standard employing an Instron type tester, the wedge type cut is pulled so as to open it and the obtained breaking tenacity value is preferably between 0.5 and 50 kg/mm$^{3/2}$.

Furthermore, the linear expansion coefficient of said molding material is preferably below 12×10$^{-5}$/° C., and is more preferably below 7×10$^{-5}$/° C.

Furthermore, the heat deformation temperature of said molding material, at a bending stress of 18.6 kgf/cm$^2$ in accordance with ASTM-D648, is preferably at least 50° C., and is more preferably at least 70° C.

The fiber is preferably subjected to washing before kneading. Example of the preferable washing method is as follows. The fiber is sintered into water of 40 to 75° C. in an amount of twice of the weight of the fiber, after ten minutes to one hour, preferably ten minutes, then the fiber is taken out and squeezed. The process is repeated 3 to 10 (preferably 3 to 5) times.

Furthermore, the volume resistivity of said molding material, measured in accordance with JIS K 6911, is preferably at least 10$^9$ Ω cm, and is more preferably at least 10$^{16}$ Ω cm.

In the present invention, a natural fiber and a thermoplastic resin are first kneaded employing a non-screw type mixer such as a tumbler mixer, a high speed rotary mixer, a V blender, a ribbon blender, a Banbury mixer, and the like. Of these, the Banbury mixer is most preferred. Furthermore, as preferable kneading conditions, the operation is carried out at 70 to 150° C., and is more preferably carried out at 70 to 120° C. It is preferred to maintain the kneading temperature in this range, because the generation of furfural may be decreased and fogging as well as offensive odor may be effectively prevented or minimized. Molding such as injection molding and the like is preferably carried out in the range of 70 to 150° C., more preferably 100 to 130° C. It is more preferred to heat at 50 to 80° C. for 1 or 2 days.

The mixing ratio of a vegetable fiber with a thermoplastic resin is preferably between 50 and 90 percent by weight from the aspects of injection molding properties, strength, and combustion calories, and is most preferably between 55 and 75 percent by weight. Production methods for mixed molding parts comprised of the vegetable fiber and the thermoplastic resin are not particularly limited, and any of the several methods known in the art may be employed. For example, those obtained by shearing pulp, waste paper, and the like into small pieces employing a shearing machine and a thermoplastic resin are well mixed at a temperature at least 10° C. higher than its melting point, and the resulting mixture is used to be molded into desired products.

Specifically, during injection molding, it is necessary to regulate temperature conditions so that materials flow sufficiently into all crevices of the molding die.

Mixture molding parts comprised of a vegetable fiber and a thermoplastic resin exhibit a markedly small contraction ratio after injection molding compared to plastics. Accordingly, it is possible to enhance molding and machining efficiency (being a decrease in cooling time) and to improve dimensional stability followed by markedly overcoming light shielding problems and removing problems of photosensitive materials due to poor assembly and deformation. Furthermore, affinity with adhesives is improved due to the presence of cellulose components, and adhesion is enhanced compared to plastics. Thus, connection with other parts such as a paper-made body is easily carried out to increase the strength of the connected parts.

In the present invention, a mixed molding material consisting of a vegetable fiber and a thermoplastic resin may be employed in some portion of the component constituting a molding material or it may be employed to constitute an entire molding material. Said mixed molding material is preferably employed to produce parts which require a relatively high strength and hardness in terms of the structure.

The molding material of the present invention, when employed as various resin materials for photosensitive photographic materials, may sufficiently exhibit the effects of the present invention. Said material may be employed for a body and the like for a lens-fitted film, and may preferably be employed for its front and rear covers.

EXAMPLES

The present invention will be described with reference to examples below. However, the present invention is not limited to these examples.

Evaluation Method
Material Evaluation

Fog evaluation was carried our employing a negative film strip with an ISO sensitivity of 400 (LV400, manufactured by Konica Corp.).

Conditions

When a 100 $cm^2$ photosensitive material, which is removed from an aluminum vessel having an inner diameter of 76 mm and a height of 50 mm, after said photosensitive material left standing at 23° C. and 55% RH for 24 hours is placed into said aluminum vessel and is tightly sealed, and subsequently is left standing at 65° C. for 72 hours, and thereafter, is cooled at 23° C. and 55% RH for 12 hours, is designated as Sample A, and a 100 $cm^2$ photosensitive material which is removed from an aluminum vessel having an inner diameter of 76 mm and a height of 50 mm, after said photosensitive material left standing at 23° C. and 55% RH for 24 hours and 4 g of a molding material comprised of a mixture consisting of a vegetable fiber and a thermoplastic resin in an amount of less than said vegetable fiber as the main components, left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours, is designated as Sample B, Sample B were then subjected to white light exposure through a sensitometric step wedge and to the following photographic processing. The fog density of the green-sensitive layer was evaluated in terms of fog density of Sample B–fog density of Sample A.

| "Processing Conditions" | | |
|---|---|---|
| Processing Step | Processing Time | Processing Temperature |
| Color Development | 3 minutes 15 seconds | 38° C. |
| Bleaching | 45 seconds | 38° C. |
| Fixing | 1 minute 30 seconds | 38° C. |
| Stabilizing | 1 minute | 38° C. |
| Drying | 1 minute | 55° C. |

| "Color Developer" | |
|---|---|
| Water | 800 cc |
| Potassium carbonate | 30 g |
| Sodium bicarbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-Amino-3-methyl-N-ethyl-N-(βhydroxyethyl)-aniline sulfate | 4.5 g |
| Diethylenetriaminepentaacetic acid | 3.0 g |
| Potassium hydroxide | 1.2 g |
| Water to make | 1 liter |

The pH is adjusted to 10.06 using potassium hydroxide or 20% sulfuric acid.

| "Bleaching Solution" | |
|---|---|
| Water | 700 cc |
| 1,3-Diaminopropanetetraacetic acid ferric ammonium | 125 g |
| Ethylenediaminetetraacetic acid | 2 g |
| Sodium nitrate | 40 g |
| Ammonium bromide | 150 g |
| Glacial acetic acid | 40 g |
| Water to make | 1 liter |

The pH is adjusted to 4.4 using aqueous ammonia or glacial acetic acid.

| "Fixing Solution" | |
| --- | --- |
| Water | 800 cc |
| Ammonium thiocyanate | 120 g |
| Ammonium thiosulfate | 150 g |
| Sodium sulfite | 15 g |
| Ethylenediamnetetraacetic acid | 2 g |

After adjusting the pH to 6.2 using aqueous ammonia or glacial acetic acid, the total volume is adjusted to 1 liter by adding water.

| "Stabilizer" | |
| --- | --- |
| Water | 900 cc |
| Paraoctylphenyl polyoxyethylene ether (n = 10) | 2.0 g |
| Dimethylolurea | 0.5 g |
| Hexamethylenetetramine | 0.2 g |
| 1,2-Benzoisothiazoline-3-one | 0.1 g |
| Siloxane | 0.1 g |
| Aqueous ammonia | 0.5 cc |
| Water to make | 1 liter |

The pH is adjusted to 8.5 employing aqueous ammonia or 50% sulfuric acid.

Evaluation of Molded Parts

Injection molding was carried out under the conditions described below employing a molding material comprising of a mixture consisting of a vegetable fiber and a thermoplastic resin as the main components.

Molding machine: J75SA (manufactured by Nihon Seiko Ltd.)

Gate: central part φ 0.5 mm pin

Molding die: 1×100×100 mm

Temperature of molding die: 40° C.

Injection temperature: temperature was gradually raised from the melting point of the molding material +10° C., molding was carried out while confirming the temperature at which the molding material entered into edges of the molding die.

When a 100 cm² photosensitive material, which is removed from an aluminum vessel having an inner diameter of 76 mm and a height of 50 mm, after said photosensitive material left standing for 24 hours in a dark room conditioned at 23° C. and 55% RH is placed into said aluminum vessel and is tightly sealed, and subsequently is left standing at 65° C. for 72 hours, and thereafter, is cooled at 23° C. and 55% RH for 12 hours, is designated as Sample C, and a 100 cm² photosensitive material, which is removed from an aluminum vessel having an inner diameter of 76 mm and a height of 50 mm after said photosensitive material left standing at 23° C. and 55% RH for 24 hours and 4 g of a molding product which is obtained by crushing into pieces having a size of approximately no more than 5 mm a molded product having a specified shape comprised of a mixture consisting of a vegetable fiber and a thermoplastic resin in an less amount than said vegetable fiber, left standing at 23° C. and 55% RH for 24 hours are placed into said aluminum vessel and are tightly sealed, and subsequently are left standing at 65° C. for 72 hours, and thereafter, are cooled at 23° C. and 55% RH for 12 hours, is designated as Sample D, Sample C and Sample D are subjected to white light exposure through a sensitometric step wedge and to the aforementioned photographic processing and the fog density of the green-sensitive layer is then measured.

Evaluation for offensive odor was carried out based on the 6 grades shown below.

5 no offensive odor 4 slightly sensed offensive odor (detection threshold value)

3 easily sensed but weak offensive odor 2 definite offensive odor 1 strong offensive odor 0 unendurably strong offensive odor External appearance was evaluated based on the 6 grades shown below.

5 glossy appearance 4 somewhat less glossy appearance 3 fine ripples on the surface 2 lumps of the vegetable fiber material were observed 1 surface was rough 0 actual vegetable fibers appeared on the surface Example 1

Preparation of Molding Material 1 Comprised of a Mixture Consisting of a Vegetable Fiber and a Thermoplastic Resin as the Main Components Commercially available broadleaf tree pulp (made in Indonesia; Nippon Kami Pulp Trading) was dispersed into each of distilled water, diluted hydrochloric acid, and diluted aqueous ammonia to obtain a pulp concentration of 0.5 percent in each solution, and was washed. Further, washing was carried out employing distilled water until the electrical conductivity of the composition after washing was below 10 µS. After filtering the resulting composition well employing a glass filter, drying was carried out at an inner temperature of 40° C. employing a vacuum constant temperature dryer while reducing the interior dryer pressure to 10 mmHg. The obtained pulp after washing was cut into 5 mm cubes.

While heating the temperature maintaining layer of a Banbury mixer (Plasticoder PL-2000, manufactured by Brabender Co.) employing water heated at 60° C., the components described below were placed into said mixer and kneaded.

| | |
| --- | --- |
| Aforementioned pulp after washing | 55 weight parts |
| Ethylene-vinyl acetate copolymer (EV40LX, manufactured by Mitsui-du Pont Co.) | 40 weight parts |
| Hydrogenated product of liquid polyisoprene (LIR-290 manufactured by Kuraray Co.) | 5 weight parts |
| Carbon black (manufactured by Ketchen Black Co.) | 0.5 weight part |

The pressing part in the upper portion of the device was opened and the kneaded state was visually confirmed. When pulp lumps disappeared and uniform kneading was carried out, the kneader was stopped and the sample was removed. The removed sample was manually torn into pieces employing hands with gloves to prepare Molding Material 1.

The increase in fog due to said Molding Material 1 was 0.01. The offensive odor of said Molding Material 1 was evaluated by 10 observers based on the aforementioned evaluation criteria. All members graded the samples no less than 4, with an average of 4.9.

Further, Molded Product 1 was molded by the aforementioned molding machine employing said Molding Material 1. An increase in fog due to Molded Product 1 was 0.02. Furthermore, the offensive odor as well as external appearance of said Molded Product 1 was evaluated by 10 observers based on the aforementioned evaluation criteria. All members graded the samples no less than 4 with an average of 4.8 and 4.7, respectively.

Furthermore, said Molding Material 1 was placed into a molding die of the external packaging material of a lens-fitted film for injection molding, and the molded part was employed for assembly into a product. A negative film strip with an ISO sensitivity of 400 (LV400, manufactured by Konica Corp.) was placed in the resulting product, and was stored for 6 months in ambient conditions of 23° C. and 55%. At the same time, said film strip was placed in a common resin canister and was stored under the same conditions. Both samples were then subjected to exposure employing the aforementioned sensitometric exposure method and photographic processing. The increase in fog of the green-sensitive layer was measured, and 0.02 was obtained. As described above, it is found that with the molding material, by minimizing fog, effects are simultaneously obtained in which offensive odor as well as degradation of external appearance may be minimized.

Example 2

The components described below were placed into a Banbury mixer (PL-2000, manufactured by Brabender Co.) while heating the insulation layer to 140° C. employing silicone oil, and subsequently kneaded.

| | |
|---|---|
| Aforementioned pulp after washing | 55 weight parts |
| Polypropylene (EC09, manufactured By Nippon Polychem Co.) | 25 weight parts |
| Hydrogenated product of liquid polyisoprene (LIR-290 manufactured by Kuraray Co.) | 20 weight parts |
| Carbon black (manufactured by Ketchen Black Co.) | 0.5 weight part |

The pressing part in the upper portion of the kneader was opened and the kneaded state was visually confirmed. When pulp lumps disappeared and uniform kneading was carried out, the kneader was stopped and the sample was removed. The removed sample was manually torn into small pieces employing hands with gloves to prepare Molding Material 2.

The increase in fog due to said Molding Material 2 was 0.03. The offensive odor of said Molding Material 2 was evaluated by 10 observers based on the aforementioned evaluation criteria. All members graded the samples no less than 4, with an average of 4.6.

Further, Molded Product 2 was molded by the aforementioned molding machine employing said Molding Material 2. The increase in fog due to Molded Product 2 was 0.08.

Furthermore, the offensive odor as well as external appearance was evaluated by 10 observers based on the aforementioned evaluation criteria. All members graded the samples no less than 4, with an average of 4.2 and 4.3, respectively.

Furthermore, said Molding Material was placed into a molding die of injection molding for the external packaging material of a lens-fitted film, and the molded part was employed for assembly of a product. A negative film strip with an ISO sensitivity of 400 (LV400, manufactured by Konica Corp.) was placed in the resulting product, and was stored for 6 months in ambient conditions of 23° C. and 55%. At the same time, said film strip was placed in an common resin canister and was stored under the same conditions. Both were then subjected to exposure employing the aforementioned sensitometric exposure method and photographic processing. The increase in fog of the green-sensitive layer was measured to obtain 0.10. As described above, it is found that with the molding material, by minimizing fog, effects are simultaneously obtained in which offensive odor as well as degradation of external appearance is minimized.

Comparative Example

In accordance with Japanese Patent Publication Open to Public Inspection No. 7-225453, the components described below were placed into a Banbury mixer (PL-2000, manufactured by Brabender Co.) while heating its insulation layer at 160° C. employing silicone oil and subsequently kneaded.

| | |
|---|---|
| Waste Kraft paper | 40 weight parts |
| Polypropylene (EC09, manufactured by Nippon Polychem Co.) | 60 weight parts |

The pressing part in the upper portion of the kneader was opened and the kneaded state was visually confirmed. When pulp lumps disappeared and uniform kneading was carried out, the kneader was stopped and the sample was removed. The removed sample was manually torn into pieces employing hands with gloves to prepare Molding Material 3.

The increase in fog due to said Molding Material 3 was 0.22. The offensive odor of said Molding Material 3 was evaluated by 10 observers based on the aforementioned evaluation criteria. All members graded the samples below 2, with an average of 1.2.

Further, Molded Product 3 was molded by the aforementioned molding machine employing said Molding Material 3. The increase in fog due to Molded Product 3 was 0.4.

The offensive odor as well as external appearance of said Molded Product 3 was evaluated by 10 observers based on the aforementioned evaluation criteria, and the average evaluations were 1.5 and 2.3, respectively.

Furthermore, said Molding Material was placed into a molding die for the external packaging material of a lens-fitted film for injection molding, and the molded part was employed for assembly of a product. A negative film strip with an ISO sensitivity of 400 (LV400, manufactured by Konica Corp.) was placed in the resulting product, and was stored for 6 months at ambient conditions of 23° C. and 55%. At the same time, said film strip was placed in a common resin canister and was stored under the same conditions. Both film strips were then subjected to exposure employing the aforementioned sensitometric exposure method and photographic processing. The increase in fog of the green-sensitive layer was measured and 0.30 was obtained.

As described above, it is found that the molding material comprised of the mixture consisting of the vegetable fiber and the thermoplastic resin in a amount of less than said vegetable fiber as the main component, which is prepared so that the fog level is not more than 0.2, exhibits no offensive odor, and those having a fog level of no more than 0.2, which are molded employing said molding material exhibit no offensive odor and further has an excellent appearance, and in addition, results in no problem when employed for photosensitive photographic materials.

Example 3

Commercially available total stalk pulp sheets (made in Thailand, having a thickness of 1 mm) were shredded in an MS shredder-4280 (manufactured by Myojo Shokai Co.) and cut into about 3 mm×3 cm pieces.

The resulting kenaf pulp in an amount of 275 g was placed into a 2-shaft screw type kneader and kneaded. However, it was impossible to continue kneading because the shaft of the kneader hit the interior sides due to deformation and the kneader was stopped.

Kenaf pulp in amount of 50 g was placed into a Banbury type kneader (having a capacity of 650 ml) attached with a Labo Plasto mill (manufactured by Toyo Seiki Co.), and the interior of the kneader was heated to 120° C. When the temperature reached 120° C., 200 g of low density polyethylene (having an MFR of 34) were placed therein, and the resin was dissolved while kneading. When the resin was dissolved and started mixing with the pulp, heat generation commenced. Then the exterior of the kneader was water-cooled and the temperature in the interior of the kneader was regulated between 120 and 150° C. Thereafter, 12.5 g of Alcon P-125 (a hydrogenated petroleum resin manufactured by Arakawa Kagaku Co.) were added, and further 4 g of carbon black (#950, manufactured by Mitsui Kagaku Co.) were added. Further, 225 g of the kenaf pulp were gradually added over 10 minutes. After kneading for 20 minutes, 12.5 g of butyl stearate were added and the resulting mixture was kneaded for 20 minutes further. The obtained kneaded material was placed in a pelletizer, while hot, to prepare pellets. The resulting pellets were heated to the temperatures shown in Table 1, and injection molding was carried out at a die temperature of 40° C. employing an injection molding machine (J75SA, manufactured by Nippon Seikosho Co.).

In the same manner, while varying the types and amount of pulp, types and amount of plasticizers, and the treatment temperatures shown in Table 1, photographic performance was evaluated in as well as out of the range of the present invention.

Further, valuation was carried out as described below.
<Photographic Performance>
Evaluation was carried out under the conditions of the present invention. Further, LV-400, manufactured by Konica Corp., was employed as a photographic material.

| Evaluation Criteria | Variation of Fog Density |
|---|---|
| 5 | 0.01 or less |
| 4 | 0.01 to less than 0.03 |
| 3 | 0.03 to less than 0.1 |
| 2 | 0.1 to less than 0.2 |
| 1 | 0.2 to less than 0.5 |
| 0 | 0.5 or more |

An evaluation of 3 or more is commercial viable.
<Evaluation of Offensive Odor>
Ten observers participated in the evaluation. Each sample was evaluated based on the criteria described below, and evaluation results of all members were collected. Table 1 shows the evaluation results of the maximum number of observers.
Evaluation Criteria
5 no offensive odor
4 slightly sensed offensive odor
3 easily sensed but weak offensive odor
2 definite offensive odor
1 strong offensive odor
0 unendurably strong offensive odor
An evaluation of 4 or more is commercially viable.
<Dimensional Stability>
A 1×100×100 mm molding die for injection molding was employed. The value obtained by the following formula was evaluated as described below.

The value in % was expressed by $|B-A|/A \times 100$;

wherein A represents the size of the die (100 mm), and B represents the size of the molded part.
5: the same size as the die
4: 0.01 to less than 0.1%
3: 0.1 to less than 0.5%
2: 0.5 to less than 1%
1: 1 to less than 2%
0: over 2%
An evaluation of 4 or higher is commercially viable. Table 1 shows the evaluation results.

TABLE 1

| Composition | | | | Injection Properties | | | | | | Photographic Performance |
|---|---|---|---|---|---|---|---|---|---|---|
| Natural Fiber | | Plasticizer | | Kneading | | | | Dimensional Stability | | |
| Type | Weight (g) | Type | Weight (g) | Temperature °C. | Offensive Odor | Temperature °C. | Offensive Odor | Longitudinal | Lateral | Height | |
| Kenaf | 275 | Alcon P125 | 12.5 | 150 | 5 | 150 | 5 | 5 | 5 | 5 | 5 | Inv. |
| Kenaf | 275 | Alcon P125 | 12.5 | 150 | 5 | 170 | 4 | 5 | 5 | 5 | 4 | Inv. |
| Kenaf | 275 | Alcon P125 | 12.5 | 125 | 5 | 150 | 5 | 5 | 5 | 5 | 5 | Inv. |
| Kenaf | 275 | Alcon P125 | 12.5 | 165 | 4 | 150 | 4 | 5 | 5 | 5 | 4 | Inv. |

TABLE 1-continued

| | Composition | | | | Injection Properties | | | | | | |
|---|---|---|---|---|---|---|---|---|---|---|---|
| | Natural Fiber | | Plasticizer | | Kneading | | | | Dimensional Stability | | | Photographic Performance |
| Type | Weight (g) | Type | Weight (g) | Temperature °C. | Offensive Odor | Temperature °C. | Offensive Odor | Longitudinal | Lateral | Height | mance | |
| Kenaf | 275 | Alcon P125 | 12.5 | 165 | 4 | 170 | 4 | 5 | 5 | 5 | 3 | Inv. |
| Poplar | 275 | Alcon P125 | 12.5 | 150 | 5 | 150 | 4 | 5 | 5 | 5 | 4 | Inv. |
| Japanese Red Pine | 275 | Alcon P125 | 12.5 | 150 | 4 | 150 | 4 | 5 | 5 | 5 | 4 | Inv. |
| Used Newspaper | 275 | Alcon P125 | 12.5 | 150 | 4 | 150 | 4 | 5 | 4 | 4 | 4 | Inv. |
| Used Newspaper | 275 | Alcon P125 | 12.5 | 180 | 1 | 200 | 1 | 5 | 4 | 4 | 1 | Comp. |
| Kenaf | 300 | Alcon P125 | 14 | 150 | 4 | 170 | 4 | 5 | 5 | 5 | 4 | Inv. |
| A Plan | 320 | Alcon P125 | 12.5 | 155 | 4 | 155 | 4 | 5 | 5 | 5 | 4 | Inv. |
| No Specific Type | 275 | Alcon P125 | 12.5 | 150 | 5 | 160 | 5 | 1 | 1 | 1 | 5 | Inv. |

A Plan: Printing paper (Heiwa Shigyo) employing 10% kenaf pulp

Example 4

Kenaf, which was cultivated from seed and was grown to a height of 2.5 m, was cut, and stripped of leaves. After crushing the stalks well employing a wooden hammer, the crushed stalks were boiled in water for 2.5 hours. The epidermis, which colored to black was peeled away, and removed. The resulting material was washed under running water and was filtered employing cotton fabric. The residue on the cotton fabric was placed into a vessel, and water was added so that the concentration of the solid portion was 5 percent by weight and the pH was adjusted to 4.5. Purified xylanase agent (manufactured by SIGMA Co.) in an amount of one percent by weight of kenaf fiber was added to the resulting composition. The resulting mixture was kept standing at 50° C. for 10 days. It was again filtered employing cotton fabric and the residue was well beaten with a wooden hammer. Thereafter, washing and drying were carried out to obtain a pulp. The resulting pulp was mixed by kneading with a thermoplastic resin in the same manner as Example 1. The resulting kneaded composition was subjected to processing in the same manner as Example 1, and subjected to injection molding. Furthermore, the sample of kenaf pulp was prepared by replacing purified xylanase agent with the hemicellulose enzyme shown in Table 2, and was evaluated in the same manner. Table 2 shows the results.

TABLE 2

| | | Kneading | | | | Injection Properties | | | |
|---|---|---|---|---|---|---|---|---|---|
| Enzyme | | | | | | Dimensional Stability | | | |
| Manufacturer | Product Name | Temperature °C. | Offensive Odor | Temperature °C. | Offensive Odor | Longitudinal | Lateral | Height | Photographic Performance |
| SIGMA | Xylanase | 178 | 5 | 180 | 5 | 5 | 5 | 5 | 5 |
| Clearant | Caltazaim HS | 178 | 4 | 180 | 4 | 5 | 5 | 5 | 4 |
| Clearant | Caltazaim MP | 178 | 5 | 180 | 5 | 5 | 5 | 5 | 5 |
| Ciba Gaygee | Albazaim 10A | 178 | 4 | 180 | 4 | 5 | 5 | 5 | 4 |
| Nobonorudisc | Pulpzaim A/S | 178 | 5 | 180 | 4 | 5 | 5 | 5 | 4 |
| Voist Alpin | VAI Xylanase | 178 | 5 | 180 | 4 | 4 | 5 | 5 | 4 |
| Premarco Biotech | Ecopulp TX-200 | 178 | 5 | 180 | 4 | 5 | 5 | 5 | 4 |
| Zenega Bioproduct | Ecozaim | 178 | 5 | 180 | 5 | 5 | 5 | 5 | 5 |
| Igen Corporation | GS-35 | 178 | 4 | 180 | 4 | 5 | 5 | 5 | 4 |
| | None | 178 | 3 | 180 | 2 | 5 | 5 | 5 | 2 |

Example 5

Samples were prepared in the same manner as Example 2, except that the compounds described in Table 3 were added. The resulting samples were evaluated in the same manner as Example 2. Table 3 shows the results.

TABLE 3

| Compound | | Kneading | | Injection Properties | | | | | |
|---|---|---|---|---|---|---|---|---|---|
| Illustrated | Weight | Temperature | Offensive | Temperature | Offensive | Dimensional Stability | | | Photographic |
| No. | (g) | ° C. | Odor | ° C. | Odor | Longitudinal | Lateral | Height | Performance |
| I-1 | 2 | 178 | 5 | 180 | 5 | 5 | 5 | 5 | 5 |
| I-5 | 2 | 178 | 5 | 180 | 5 | 5 | 5 | 5 | 5 |
| II-2 | 3 | 178 | 5 | 180 | 4 | 5 | 5 | 5 | 4 |
| III-2 | 4 | 178 | 5 | 180 | 5 | 5 | 5 | 5 | 5 |
| IV-6 | 1 | 178 | 4 | 180 | 4 | 5 | 5 | 5 | 4 |
| V-3 | 2 | 178 | 5 | 180 | 5 | 5 | 5 | 5 | 4 |
| Tetra-methylol-cyclo-hexanol | 4 | 178 | 5 | 180 | 5 | 5 | 5 | 5 | 4 |
| None | | 178 | 3 | 180 | 2 | 5 | 5 | 5 | 2 |

Example 6

Commercially available office paper waste pulp made in North America (Nippon Kami Pulp Shoji) was cut into cubes of 5 mm$^3$.

Six Samples, 1-A, 1-B, 1-C, 1-D, 1-E, and 1-F, were obtained by kneading compositions described below employing a Banbury mixer (Plasticoder PL-2000 manufactured by Brabender Co.), while varying kneading conditions such as the rotation frequency, the temperature of a constant temperature vessel, the kneading time, and the like.

| | |
|---|---|
| Cut pulp | 60 weight parts |
| Ethylene-vinyl acetate copolymer (EV40W.Y, manufactured by Mitsui-du Pont Co.) | 35 weight parts |
| Butyl stearate (manufactured by Kao Corp.) | 1 weight part |
| Hydrogenated rosin (Estergum, manufactured by Arakawa Kagaku Co.) | 4 parts |

Photographic performance of negative film with an ISO sensitivity of 400 (JX400, manufactured by Konica Corp.) was measured within as well as out of the range of the present invention. One gram of each sample was accurately weighed and was conditioned in ambient conditions of 23° C. and 55% RH for 24 hours. Thereafter, the resulting sample was placed into a 30-cc vial and was tightly sealed with an aluminum seal, and heated for 30 minutes in an oil bath maintained at 120° C.

Gasses in the vial were measured by GC-MASS and furfural evaluated as described below. was quantitatively analyzed employing a calibration curve, which had been prepared in advance employing said GC-MASS. The analyzed furfural was converted to the amount per g of the sample. Further evaluation was carried out according to the method described below. Table 4 shows the results.

<Evaluation of Offensive Odor>

Ten observers evaluated the resulting samples based on the criteria described below. The results were expressed in averages.

| Intensity of Offensive Odor | Subjective Evaluation |
|---|---|
| 5 | no offensive odor |
| 4 | slightly sensed offensive odor (detection threshold value) |
| 3 | easily sensed but weak offensive odor |
| 2 | definite offensive odor |
| 1 | strong offensive odor |
| 0 | unendurably strong offensive odor |

An offensive odor level of 4 or more is commercially viable.

TABLE 4

| Sample No. | Weight of Furfural μg/g of the Sample | Photographic Performance | Offensive odor |
|---|---|---|---|
| 1-A | 0 | 0.1 | 5 |
| 1-B | 1 | 0.1 | 5 |
| 1-C | 2 | 0.15 | 4.8 |
| 1-D | 4 | 0.16 | 4.3 |
| 1-E | 10 | 0.18 | 4.15 |
| 1-F | 15 | 0.4 | 2.5 |

As shown in the evaluation above, Samples which exhibited photographic performance in the range of the present invention, as well as generated furfural in an amount of no more than 10 μg/g of the Sample are commercially viable.

Example 7

Sample 1-A obtained in Example 6 was subjected to injection molding as described below.

Molding machine: J75SA (manufactured by Nihon Seiko Co.)

Gate: central portion 0 0.5 mm pin

Molding die: molding dies for the front and rear covers of the Torikkiri Konica

Six Samples (1-A-1, 1-A-2, 1-A-3, 1-A-4. 1-A-5, and 1-A-6) of the outer packaging container for Konica, of which photographic performance was in as well as out of the range of the present invention were injection-molded, under varying injection molding conditions such as the melting temperature, the injection pressure, the injected amount, the molding die temperature, and the like. Samples were crushed into cubes of about no more than 5 mm, and the photographic performance was measured in the same manner as Example 6.

<Evaluation of External Appearance>

Ten observers evaluated the resulting samples according to the criteria described below, and the results were empresses in average.

| Rank of External Appearance | Subjective Evaluation |
| --- | --- |
| 5 | glossy appearance |
| 4 | somewhat less glossy appearance |
| 3 | fine ripples on the surface |
| 2 | lumps of the vegetable fiber material were observed |
| 1 | surface was rough |
| 0 | vegetable fibers appeared on the surface |

A level 4 or higher of the external appearance evaluation is commercially viable.

TABLE 5

| Sample No. | Weight of Furfural $\mu g/g$ of Sample | Photographic Performance | External Appearance | Offensive odor |
| --- | --- | --- | --- | --- |
| 1-A-1 | 1 | 0.1 | 5 | 5 |
| 1-A-2 | 2 | 0.15 | 4.8 | 4.8 |
| 1-A-3 | 3 | 0.15 | 4.6 | 4.5 |
| 1-A-4 | 4 | 0.17 | 4.3 | 4.3 |
| 1-A-5 | 10 | 0.18 | 4.1 | 4.15 |
| 1-A-6 | 17 | 0.8 | 1.3 | 2.0 |

As shown in the evaluation above, Samples, which were, exhibited photographic performance in the range of the present invention and generated furfural in an amount of no more than 10 $\mu g/g$ of the Sample, resulted in no commercially viable problems with offensive odor nor in external appearance.

Example 8

Six Samples 2-A, 2-B, 2-C, 2-D, 2-E and 2-F were obtained in such a manner that the same components as Example 6, in which the ratio of the vegetable fiber to the resin was varied so that the content of said vegetable fiber was more than said resin, were kneaded, employing a Banbury mixer (Plasticoder PL-2000, manufactured by Brabender Co.) under varying kneading conditions, such as the rotational frequency, the temperature of a constant temperature vessel, the kneading time in accordance with said ratio.

The resulting Samples were then evaluated in the same manner as Example 6.

TABLE 6

| Sample No. | Combustion Heat Amount cal/g | Photographic Performance | Offensive Odor |
| --- | --- | --- | --- |
| 2-A | 5000 | 0.18 | 4.3 |
| 2-B | 6000 | 0.12 | 4.6 |
| 2-C | 7000 | 0.15 | 4.8 |
| 2-D | 8000 | 0.19 | 4.3 |
| 2-E | 4500 | 0.38 | 3.5 |
| 2-F | 12000 | 0.4 | 3.2 |

As shown in the evaluation above, Samples, which exhibited photographic performance in the range of the present invention and exhibited a combustion heat amount of 5,000 to 8,000 cal/g, resulted in no problem for commercial viability regarding offensive odor.

Example 9

Samples in Example 8 were subjected to injection molding as described below.

Molding machine: J75SA (manufactured by Nihon Seiko Co.)

Gate: central portion $\phi$ 0.5 mm pin

Molding die: molding dies for the front and rear covers of the Torikkiri Konica

Six Samples of Torikkiri Konica (2-A-2, 2-B-2, 2—C-2, 2-D-2. 2-E-2, and 2-F-2) were prepared by injection molding under varying injection conditions such as the melting temperature, the injection pressure, the injected amount, the molding die temperature, and the like. Each of the molded parts was evaluated in the same manner as Example 7. Table 7 shows the results.

TABLE 7

| Sample No. | Combustion Heat Amount cal/g | Photographic Performance | External Appearance |
| --- | --- | --- | --- |
| 2-A-2 | 5000 | 0.19 | 4.6 |
| 2-B-2 | 6000 | 0.14 | 4.3 |
| 2-C-2 | 7000 | 0.15 | 4.4 |
| 2-D-2 | 8000 | 0.18 | 4.3 |
| 2-E-2 | 4500 | 0.38 | 3.2 |
| 2-F-2 | 12000 | 0.33 | 3.7 |

As shown in the evaluation above, Samples, which exhibited photographic performance in the range of the present invention and exhibited a combustion heat amount of 5,000 to 8,000 cal/g, resulted in no problem for commercial viability regarding the external appearance.

Example 10

Six Samples 3-A, 3-B, 3-C, 3-D, 3-E, and 3-F were obtained in such a manner that the composition, in which the ratio of Kraft paper waste to a modified polyphenylene ether composite resin (Remaroi PX620, manufactured by Mitsubishi Engineering Plastic Co., Ltd.) was varied so that the content of said waste Kraft paper was in a range in which the ratio of said waste Kraft paper was at least 50 percent of the total, was kneaded by a Banbury mixer (Plasticoder PL-2000, manufactured by Brabender Co.) under varying the rotational frequency, the temperature of a constant temperature vessel, the kneading time. The resulting Samples were injection-molded into a molding die in accordance with the ASTM-D5045 Standard.

Further, each of the Samples was injected into a molding die for the cover of the Torikkiri Konica, and molded parts for it were prepared. The photographic performance, described in Example 7, was measured for each molded part. In addition, a lens-fitted film was assembled employing the molded part together with other parts employed for the commercially available Torikkiri Konica. The assembled sample was dropped from a 1 m height under ambient conditions of 23° C. and 55% RH, and evaluation was carried out according to the criteria described below.

| Evaluation Level | Standard |
| --- | --- |
| 5 | when dropped 10 times, neither cracks nor separation at claws occurred |
| 4 | when dropped 8 to 10 times, cracks as well as separation at claws occurred |
| 3 | when dropped 5 to 7 times, cracks as well separation at claws occurred |
| 2 | when dropped 2 to 4 times, cracks as well as separation at claws occurred |
| 1 | when dropped 1 time, cracks as well as separation at claws occurred |

An evaluation level of 4 or higher resulted in no problem for commercial viability.

TABLE 8

| Sample No. | Breaking Tenacity Value kg/mm$^{3/2}$ | Photographic Performance | Dropping Test |
| --- | --- | --- | --- |
| 3-A | 20 | 0.20 | 5 |
| 3-B | 10 | 0.17 | 5 |
| 3-C | 5 | 0.15 | 5 |
| 3-D | 2 | 0.12 | 5 |
| 3-E | 0.5 | 0.18 | 4 |
| 3-F | 0.1 | 0.3 | 3 |

As shown in the evaluation above, Samples, which exhibited photographic performance in the range of the present invention and exhibited a breaking tenacity value of 0.5 kg/mm$^{3/2}$, resulted in no problem for commercial viability regarding cracking and separation resistance.

Example 11

Lignin-free kenaf pulp was prepared in such a manner that cultivated kenaf (an annual plant in Malvaceae) was harvested, placed in an autoclave, heated with distilled water at an atmospheric pressure of 1.5, and washed with water. Six Samples (4-A, 4-B, 4-C, 4-D, 4-E, and 4-F) were obtained in such a manner that the composition, in which the ratio of said lignin-free kenaf pulp to metallocene polyethylene (15200, manufactured by Ube Kosan Ltd.), butyl stearate (manufactured by Kao Corp.), and hydrogenated rosin (Estergum, manufactured by Arakawa Kagaku Co.) was varied so that the content of said kenaf pulp was at least 50 percent of the total was kneaded in a Banbury mixer (Plasticoder PL-2000, manufactured by Brabender Co.) under varying kneading conditions such as the rotational frequency, the temperature of a constant temperature vessel, and the kneading time in accordance with the variation in said composition. Further, each of the resulting Samples was injected into a molding die for the cover of a Torikkiri Konica to prepare a molded part. The photographic performance described in Example 7 was measured for each molded part. In addition, a lens-fitted film was assembled employing the molded part together with other parts employed for the commercially available Torikkiri Konica. The assembled sample was dropped from a 1 m height in ambient conditions of 23° C. and 55% RH, and evaluated in the same manner as Example 10.

TABLE 9

| Sample No. | Linear Expansion Coefficient ×10$^{-5}$/° C. | Photographic Performance | Dropping Test |
| --- | --- | --- | --- |
| 4-A | 20 | 0.35 | 2 |
| 4-B | 15 | 0.25 | 3 |
| 4-C | 12 | 0.18 | 4 |
| 4-D | 10 | 0.16 | 4.5 |
| 4-E | 7 | 0.1 | 5 |
| 4-F | 5 | 0.09 | 5 |

As shown in the evaluation above, Samples, which exhibited photographic performance in the range of the present invention, and exhibited a linear expansion coefficient of no more than 12×10$^{-5}$/° C., resulted in no problem for commercial viability regarding cracking and separation resistance, and further, Samples having a linear expansion coefficient of no more than 7×10$^{-5}$/° C. were more excellent.

Example 12

Lignin-free kenaf (an annual plant in Malvaceae) pulp was prepared in such a manner that cultivated kenaf was harvested, placed in an autoclave, heated with distilled water at an atmospheric pressure of 1.5, and washed with water. Six Samples (5-A, 5-B, 5-C, 5-D, 5-E, and 5-F) were obtained in such a manner that the composition, in which the ratio of said lignin-free kenaf pulp to ethylene-vinyl acetate resin (manufactured by Mitsui-du Pont Co.), butyl stearate (manufactured by Kao Corp.), and hydrogenated rosin (Estergum, manufactured by Arakawa Kagaku Co.) was varied so that the content of said kenaf pulp was at least 50 percent of the total, and the type of said ethylene-vinyl acetate resin was varied, was kneaded in a Banbury mixer (Plasticoder PL-2000, manufactured by Brabender Co.) under varying kneading conditions such as the rotational frequency, the temperature of a constant temperature vessel, and the kneading time in accordance with the variations in said composition.

Further, each of the resulting Samples was injected into a molding die for the cover of a Torikkiri Konica to prepare a molded part. The photographic performance described in Example 7 was measured for each molded part. In addition, a lens-fitted film was assembled employing the molded part together with other parts employed for the commercially available Torikkiri Konica. After the assembled samples were kept standing for 48 hours in ambient conditions of 23° C. and 55% RH, they were dropped from a 1 m height and evaluated employing the same standards as for Example 10.

TABLE 10

| Sample No. | Heat Deformation Temperature ° C. | Photographic Performance | Dropping Test |
| --- | --- | --- | --- |
| 5-A | 40 | 0.25 | 2 |
| 5-B | 50 | 0.20 | 4 |
| 5-C | 63 | 0.18 | 4 |
| 5-D | 70 | 0.10 | 4.5 |
| 5-E | 75 | 0.12 | 5 |
| 5-F | 85 | 0.12 | 5 |

As shown in the evaluation above, Samples, which exhibited photographic performance in the range of the present invention, and exhibited a heat deformation temperature of at least 50° C., resulted in no problem for commercial viability regarding cracking and separation resistance. Samples, which exhibited a heat deformation temperature of no less than 70° C., resulted in an evaluation level of 4 under the test conditions in which the temperature of the evaluation conditions was set at 60° C., and were more excellent.

Example 13

Lignin-free kenaf (an annual plant in Malvaceae) pulp was prepared in such a manner that cultivated kenaf was harvested, placed in an autoclave, heated with distilled water at an atmospheric pressure of 1.5, and washed with water. Six Samples 6-A, 6-B, 6-C, 6-D, 6-E, and 6-F were obtained in such a manner that the composition, in which the ratio of said lignin-free kenaf pulp to metallocene polyethylene (15200, manufactured by Ube Kosan Ltd.), butyl stearate (manufactured by Kao Corp.), and hydrogenated rosin (Estergum, manufactured by Arakawa Kagaku Co.) was varied so that the content of said kenaf pulp was at least 50 percent of the total, and into which gold powder was added while regulating amounts of gold, was kneaded in a Banbury mixer (Plasticoder PL-2000, manufactured by Brabender Co.) under varying kneading conditions such as the rotational frequency, the temperature of a constant temperature vessel, and the kneading time in accordance with the variation in said composition.

Further, each of the resulting Samples was injected into a molding die for the mini-flash of the Torikkiri Konica to prepare a molded part. The photographic performance described in Example 7 was measured for each molded part. In addition, a miniflash was assembled employing the molded part together with other parts employed for the mini-flash of the commercially available Torikkiri Konica. Evaluation was then carried to rate the resulting light flash, while varying the RH from 20 to 80 percent at 40° C.

| Evaluation Level | Standard |
|---|---|
| 5 | lighted under any condition |
| 4 | not lighted under 70 to less than 80% RH |
| 3 | not lighted under 55 to less than 70% RH |
| 2 | not lighted under 20 to less than 55% RH |
| 1 | not lighted below 20% RH |

An evaluation level of 4 or higher resulted in no problem for commercially viability.

TABLE 11

| Sample No. | Volume Specific Resistivity Ωcm | Photographic Performance | Lighting Test |
|---|---|---|---|
| 6-A | $1 \times 10^{-4}$ | 0.35 | 2 |
| 6-B | $1 \times 10^{-9}$ | 0.19 | 4 |
| 6-C | $2 \times 10^{-10}$ | 0.17 | 4 |
| 6-D | $2 \times 10^{-12}$ | 0.15 | 4 |
| 6-E | $6 \times 10^{-13}$ | 0.12 | 4 |
| 6-F | $1 \times 10^{-16}$ | 0.10 | 5 |

As shown in the evaluation above, Samples, which exhibited photographic performance in the range of the present invention and exhibited a volume specific resistivity of no more than $10^{-9}$ Ω cm, resulted in no problem regarding commercial viability regarding the flash, and Samples having a volume specific resistivity of no more than $10^{-16}$ Ω cm were more excellent.

By employing a mixture consisting of a vegetable fiber and a thermoplastic resin in a amount of less than said vegetable fiber, and satisfying the aforementioned conditions, it was possible to obtain a resin material for molding and a molded part which exhibited excellent external appearance, generated no offensive odor, and gave no adverse effect on photographic characteristics, and specifically resulted in no increase in fogging.

Disclosed embodiment can be varied by a skilled person without departing from the spirit and scope of the invention.

What is claimed is:

1. A molding material comprising a cellulose based fiber and a thermoplastic resin in an amount of less than said cellulose based fiber, wherein the molding material has a following property, after 1 g of said molding material is left standing at 23° C. and 55% RH for 24 hours, the resulting material is placed into a 30-cc vessel and tightly sealed, is further heated for 30 minutes in an oil bath at 120° C. and thereafter, the amount of furfural, generated in said vessel, is no more than 10 μm/g of the molding material.

2. The molding material of claim 1, wherein said thermoplastic resin comprises no halogen atom.

3. The molding material of claim 1 wherein average length of the cellulose based fiber is between 0.3 and 3.0.

4. The molding material of claim 1 wherein the cellulose based fiber has a water content of no more than 5 percent.

5. The molding material of claim 1 wherein the molding material further comprises at least one compound selected from the compounds represented by general formulas (I) through (V) or tetramethylolcyclohexanol,

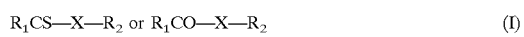

$R_1CS$—X—$R_2$ or $R_1CO$—X—$R_2$ (I)

in general formula (I), $R_1$ represents a hydrogen atom, an alkyl group, an aryl group, an alkoxy group, an acylamino group, or an amino group, $R_2$ represents a hydrogen atom, an alkyl group, an aryl group, an acyl group, an alkoxycarbonyl group, a carbamoyl group, an amino group, or an amidino group, $R_1$ and $R_2$ may bond to form a ring, X represents —$CH_2$— or —NH—;

(II)

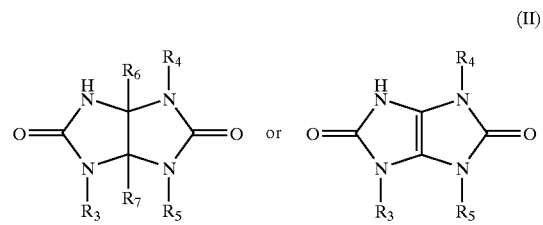

in general formula (II), $R_3$, $R_4$ and $R_5$ may be the same or different, and each represents a hydrogen atom, an alkyl group, an alkenyl group, an aralkyl group, an aryl group, or an acyl group, $R_6$ and $R_7$ each represents a hydrogen atom or an alkyl;

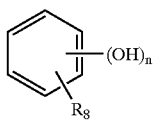
(III)

in general formula (III), $R_8$ represents a hydrogen atom, an alkyl group, or an aryl group, $R_8$ may be a group which forms naphthalene ring together with a phenyl ring, "n" represent an integer of 2 to 4;

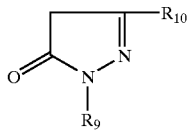
(IV)

in general formula (IV), $R_9$ represents a hydrogen atom or a substituent, $R_{10}$ represents a hydrogen atom or a substituent;

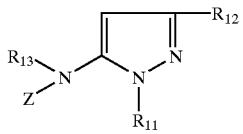
(V)

in general formula (V), $R_{11}$ and $R_{12}$ each represents a hydrogen atom or a substituent, and $R_{13}$ represents a hydrogen atom or an alkyl group, Z represents a hydrogen atom, an alkyl group, an aryl group, $-SO_2R_{14}$, or $-SO_2N(R_{14})(R_{15})$, $R_{14}$ represents an alkyl group, an aryl group, or a heterocyclic ring group, and $R_{15}$ is as defined above for $R_{13}$, $R_{13}$ and Z may be joined together to form a ring.

6. The molding material of claim 1 wherein the molding material contains a petroleum resin, rosin or a rosin derivative in an amount of 0.1 to 40 percent by weight of the total weight.

7. The molding material of claim 1 wherein combustion heat of the molding material detected by a colorimeter specified in JIS M 8814 is between 5,000 and 8,000 cal/g when 0.3 gram of the molding material is combusted at a temperature of 850° C. and an air flow rate of 300 ml/minute in a tube-shaped electric furnace in accordance with JIS K 2541.

8. The molding material of claim 1 wherein breaking tenacity value of the molding material is between 0.5 and 50 kg/mm$^{3/2}$ in a test piece (having two holes with a diameter of 5 mm and a distance of 11 mm between the hole centers) obtained by machining the aforementioned molding material having length 114 mm×width 33 mm×thickness 10 mm with a compact tension shape in accordance with ASTM-D5045 Standard when tool is inserted between the aforementioned two holes in accordance with ASTM-D5045 Standard employing an Instron type tester, the wedge type cut is pulled so as to open it.

9. The molding material of claim 1 wherein linear expansion coefficient of said molding material is below $12 \times 10^{-5}/°$C.

10. The molding material of claim 1 wherein heat deformation temperature of said molding material is at least 50° C. at a bending stress of 18.6 kgf/cm$^2$ in accordance with ASTM-D648.

11. The molding material of claim 1 wherein volume resistivity of said molding material is at least $10^9$ Ω cm measured in accordance with JIS K 6911.

12. A molded product prepared by employing the molding material of claim 1.

13. The molded product of claim 12 wherein said molded product is a container for a photosensitive material.

14. The molded product of claim 12, and said molded product is a part of a lens-fitted film.

15. The molded product of claim 14, and said molded product is an external packaging member of a lens-fitted film.

16. The molded product of claim 15, and said molded product is a front cover or a rear cover of a lens-fitted film.

17. A production method of molding material comprising steps of kneading cellulose based fiber together with a thermoplastic resin in an amount of less than said cellulose based fiber,
wherein the molding material has following property, after 1 g of said molding material is left standing at 23° C. and 55% RH for 24 hours, the resulting material is placed into a 30-cc vessel and tightly sealed, is further heated for 30 minutes in an oil bath at 120° C. and thereafter, the amount of furfural, generated in said vessel, is no more than 10 μm/g of the molding material.

18. The production method of a molding material of claim 17, wherein said kneading is carried out employing a banbury mixer.

19. The production method of a molding material of claim 17, wherein said kneading is carried out while temperature is kept at 70 to 150° C.

20. The production method of a molding material of claim 19, wherein said kneading is carried out while temperature is kept at 70 to 120° C.

21. The production method of a molding material of claim 17, wherein the cellulose fiber is washed before the kneading.

22. The production method of a molding material of claim 17, wherein the cellulose fiber is processed with helmilase enzyme.

23. A lens-fitted film unit comprising a part composed by employing the molding material of claim 1.

24. The lens-fitted film unit of claim 23 wherein the part composed by employing the molding material is outer packaging container of the lens-fitted film unit.

25. The lens-fitted film unit of claim 24 wherein the outer packaging container is a front cover or rear cover of the lens-fitted film unit.

* * * * *